(12) United States Patent
Wang et al.

(10) Patent No.: US 8,842,732 B2
(45) Date of Patent: *Sep. 23, 2014

(54) ENCODING APPARATUS, ENCODING METHOD, AND PROGRAM OF SAME

(75) Inventors: Liming Wang, Tokyo (JP); Teruhiko Suzuki, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 13/425,107

(22) Filed: Mar. 20, 2012

(65) Prior Publication Data

US 2012/0177117 A1    Jul. 12, 2012

Related U.S. Application Data

(63) Continuation of application No. 11/721,887, filed as application No. PCT/JP2006/317657 on Sep. 6, 2006, now Pat. No. 8,238,425.

(30) Foreign Application Priority Data

Sep. 15, 2005    (JP) .................................. 2005-268898

(51) Int. Cl.
  *H04N 7/12*        (2006.01)
  *H04N 19/105*      (2014.01)
  *H04N 19/112*      (2014.01)
  *H04N 19/59*       (2014.01)
  *H04N 19/174*      (2014.01)
  *H04N 19/61*       (2014.01)
  *H04N 19/33*       (2014.01)
  *H04N 19/187*      (2014.01)
  *H04N 19/16*       (2014.01)
  *H04N 19/50*       (2014.01)

(52) U.S. Cl.
  CPC ... *H04N 19/00321* (2013.01); *H04N 19/00024* (2013.01); *H04N 19/00048* (2013.01); *H04N 19/00757* (2013.01); *H04N 19/00272* (2013.01); *H04N 19/00781* (2013.01); *H04N 19/00436* (2013.01); *H04N 19/00224* (2013.01); *H04N 19/00569* (2013.01)
  USPC .................................. 375/240.12; 375/240.13

(58) Field of Classification Search
  USPC ............... 375/240.01, 240.1, 240.12, 240.13, 375/240.18, 240.25, 240.26
  See application file for complete search history.

(56) References Cited

U.S. PATENT DOCUMENTS

| 4,217,609 A | 8/1980 | Hatori et al. |
| 5,742,343 A * | 4/1998 | Haskell et al. ........... 375/240.15 |
| 2005/0069039 A1 | 3/2005 | Crinon |
| 2007/0086666 A1 | 4/2007 | Bruls |

FOREIGN PATENT DOCUMENTS

| EP | 0 644 695 | 3/1995 |
| EP | 0644695 | 3/1995 |
| JP | 05-308631 | 11/1993 |
| JP | 07-162870 | 6/1995 |

(Continued)

OTHER PUBLICATIONS

Office Action from Japanese Patent Office for Japanese Patent Application No. 2012-254240, dated Aug. 6, 2013, 3 pages.

(Continued)

*Primary Examiner* — Edward Zee
(74) *Attorney, Agent, or Firm* — Finnegan, Henderson, Farabow, Garrett & Dunner, L.L.P.

(57) ABSTRACT

An encoding apparatus for encoding progressive image data and interlace image data corresponding to this progressive image data, having a first encoding unit configured to encode picture data composing the interlace image data to generate first encoded data and decoding and recomposing the first encoded data to generate recomposed image data, an up sample processing unit configured to up sample the generated recomposed image data to generate image data having the same resolution as that of the progressive image data, and a second encoding unit configured to encode the picture data composing the progressive image data to generate second encoded data using the generated image data as predictive image data.

4 Claims, 19 Drawing Sheets

(56) References Cited

FOREIGN PATENT DOCUMENTS

| | | |
|---|---|---|
| JP | 07-274163 | 10/1995 |
| JP | 09-149415 | 6/1997 |
| JP | 10-112857 | 4/1998 |
| JP | 11-069227 | 3/1999 |
| JP | 2000-036963 | 2/2000 |
| JP | 2000-236547 | 8/2000 |
| WO | WO 2005/064948 | 7/2005 |

OTHER PUBLICATIONS

Communication and Supplemental European Search Report re: European Application No. 06797552.4-2223, dated Aug. 2, 2012, 13 pages.

Chiang, Tihao et al., "Hierarchical Coding of Digital Television," IEEE Communications Magazine, May 1994, XP-000451094, pp. 38-45.

Office Action issued by the Japanese Patent Office regarding JP Application No. 2011-043074, dated Mar. 19, 2013, 3 pages.

Office Action issued by the Japanese Patent Office regarding JP Application No. 2011-043075, dated Mar. 19, 2013, 3 pages.

Office Action issued by the Japanese Patent Office regarding JP Application No. 2005/268898, dated Nov. 29, 2011, 3 pages.

Hiroshi Fujiwara, "Point Zukaishiki Saishin MPEG Kyoskasho", Ascii Corp. (1994), pp. 148-151.

Office Action from Japanese Patent Office for Japanese Patent Application No. 2012-254240, dated Apr. 1, 2014, 5 pages.

\* cited by examiner

FIG. 6A
FIG. 6B
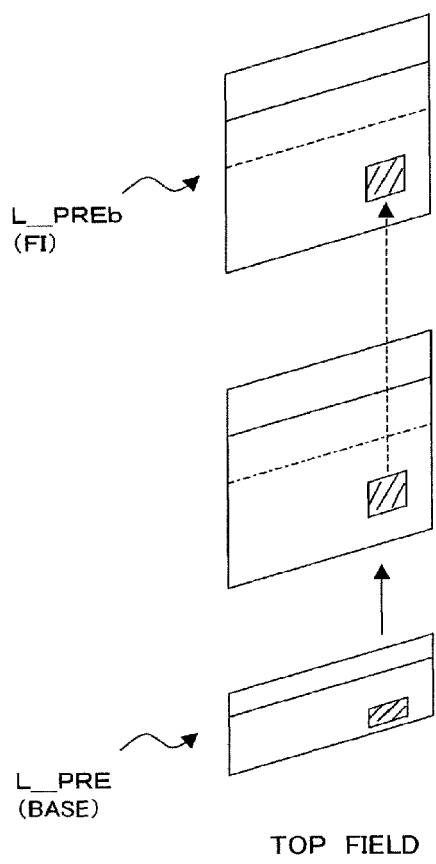
TOP FIELD
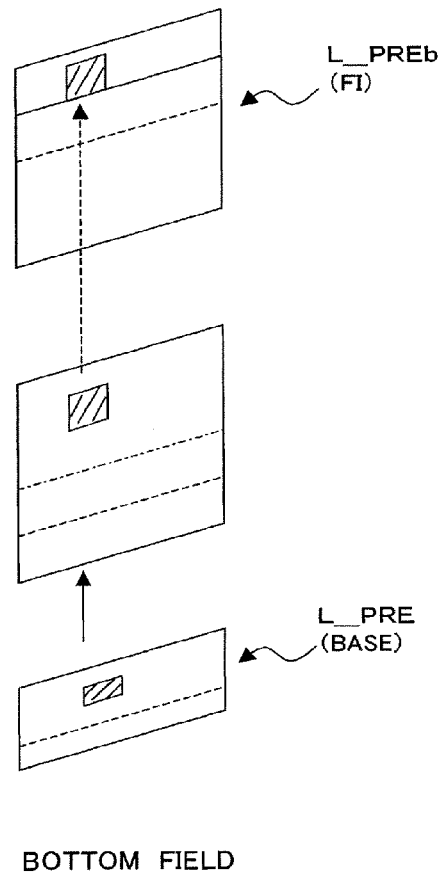
BOTTOM FIELD

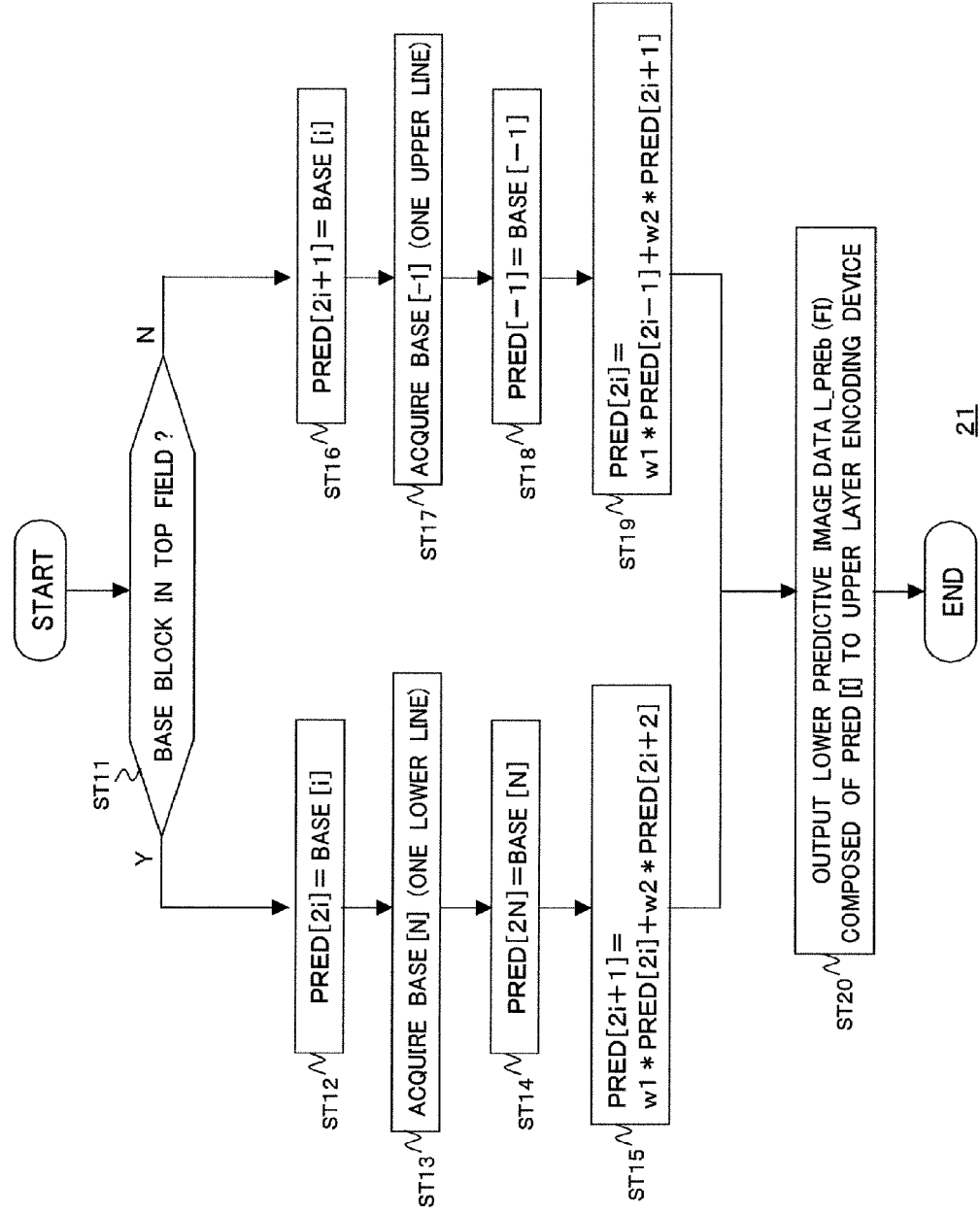

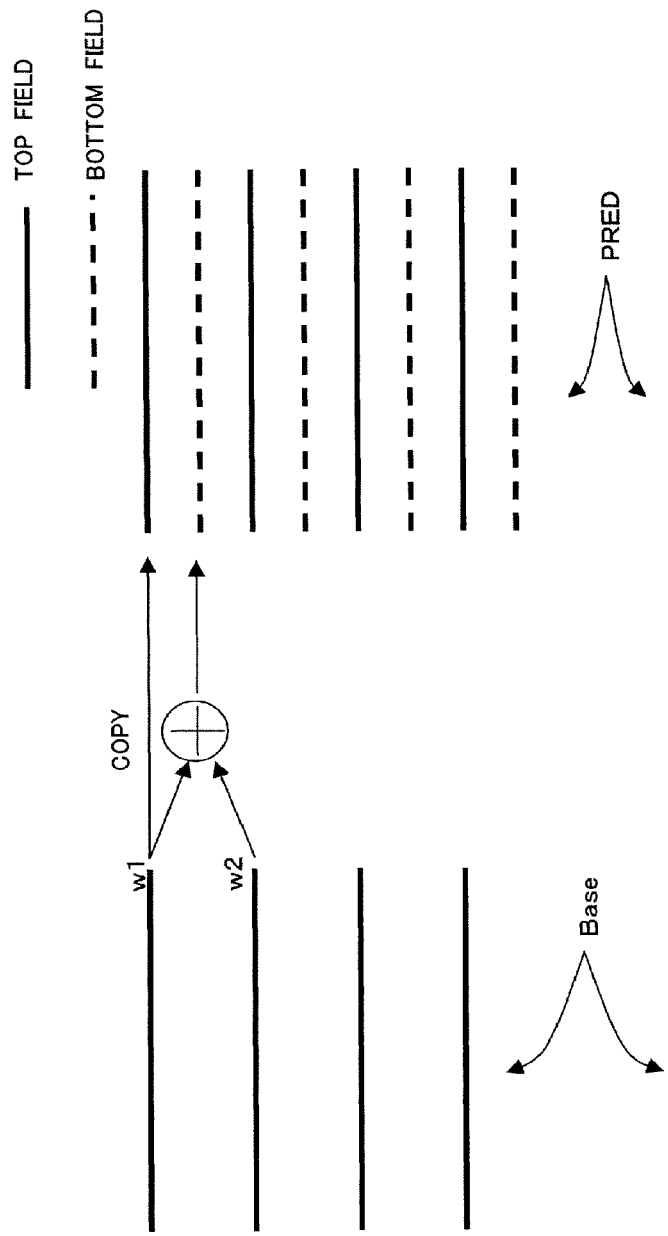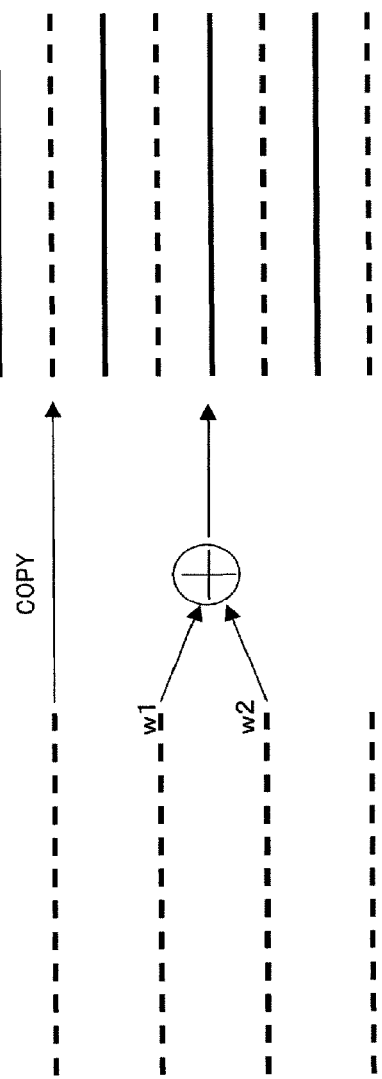
FIG. 8A
FIG. 8B

FIG. 9A
FIG. 9B
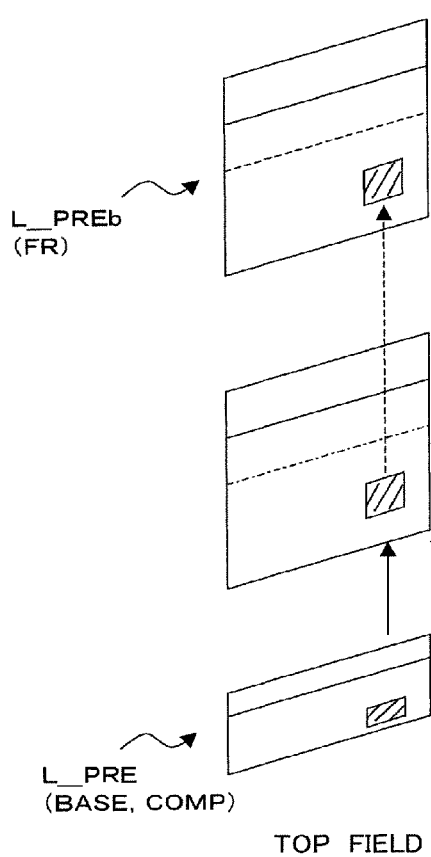
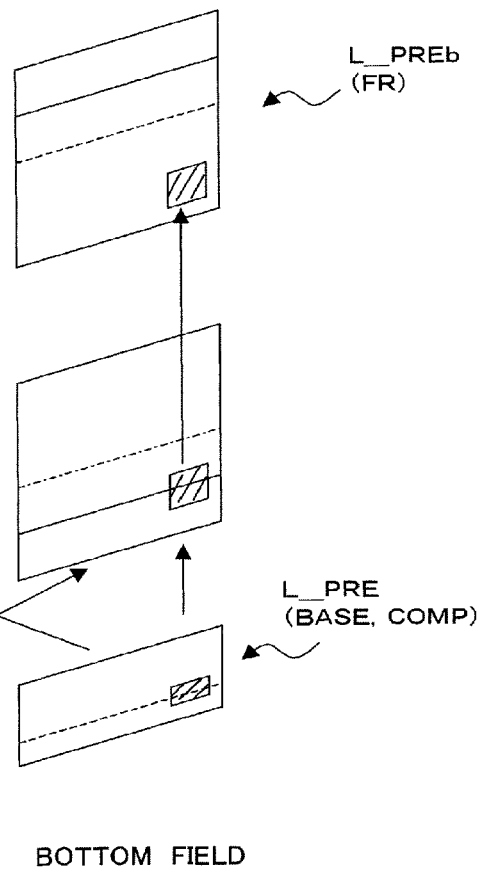
L_PREb (FR)
L_PRE (BASE, COMP)
TOP FIELD
BOTTOM FIELD

ENCODING APPARATUS, ENCODING METHOD, AND PROGRAM OF SAME

CROSS-REFERENCE TO RELATED APPLICATIONS

This is a continuation of U.S. patent application Ser. No. 11/721,887, filed Jun. 15, 2007 (now issued as U.S. Pat. No. 8,238,425, issued on Aug. 7, 2012), which is a national phase application of International Application No. PCT/2006/317657, filed Sep. 6, 2006, and claims the priority of Japanese Application No. 2005-268898, filed Sep. 15, 2005. The entire contents of these applications are incorporated herein by reference.

TECHNICAL FIELD

The present invention relates to an encoding apparatus for encoding image data, an encoding method, and a program of the same and a decoding apparatus for decoding the image data, a decoding method, and a program of the same.

BACKGROUND ART

In recent years, for the purpose of digitally handling image data and transmitting and storing information with a high efficiency at that time, after the MPEG (Moving Picture Experts Group) system utilizing the redundancy peculiar to image data and compressing it by a discrete cosine transform (DCT) or other orthogonal transform and a motion compensation, encoding apparatuses and decoding apparatuses based on the H.264/AVC (Advanced Video Coding) and other encoding systems (method) having a higher compression ratios have been spreading in both distribution of information by broadcast stations etc. and reception of information in general homes.

At present, efforts are being made for standardization by adding a function of scalability to this H.264/AVC, that is, SVC (Scalable Video Coding). The present specifications of SVC are put together in the JSM (Joint Scalable Video Model).

In an SVC encoding device, an input image is separated into for example two layers of an upper layer and a lower layer by an image layering circuit. Thereafter, the upper layer is encoded by an upper layer encoding circuit, and the lower layer is encoded by a lower layer encoding circuit. Then, the encoded upper layer and lower layer are multiplexed and transmitted.

The lower layer is also called a "base layer" and is a layer of a low quality. When decoding only the bit stream of the lower layer, an image having a relatively low quality is decoded. The lower layer includes more important information as the quality.

The upper layer is also called an "enhancement layer" and is a layer for enhancing the quality and decoding a high quality image. When decoding the bit stream of the upper layer in addition to the bit stream of the lower layer, it is possible to decode a higher quality image.

In the encoding apparatus explained above, when the upper layer encoding circuit performs intra-coding, it is possible to use the decoded image obtained by encoding, then decoding at the lower layer encoding circuit as a predictive image.

DISCLOSURE OF THE INVENTION

Problem to be Solved by the Invention

The conventional encoding apparatus performing the layered encoding explained above is predicated on encoding progressive image data at both of the upper layer and the lower layer.

However, there are demands for encoding the progressive image data in the upper layer and encoding interlace image data in the lower layer.

From the above, it is desired to provide an encoding device, an encoding method, and a program enabling encoding of progressive image data in the upper layer and encoding of interlace image data in the lower layer when performing layered encoding.

Further, it is desired to provide a decoding device, a decoding method, and a program enabling decoding of progressive image data encoded in the upper layer and interlace image data encoded in the lower layer.

Means for Solving the Problem

An encoding apparatus of a first embodiment of the present invention is an encoding apparatus for encoding progressive image data and interlace image data corresponding to the progressive image data, having a first encoding unit configured to encode picture data composing the interlace image data to generate first encoded data and decode and recompose the first encoded data to generate recomposed image data, an up sample processing unit configured to up sample the recomposed image data generated by the first encoding unit to generate image data having the same resolution as that of the progressive image data, and a second encoding unit configured to encode the picture data composing the progressive image data using the image data generated by the up sample processing unit as predictive image data to generate second encoded data.

Further, an encoding apparatus of the present invention is an encoding apparatus for encoding progressive image data and interlace image data corresponding to the progressive image data, having a first encoding means for encoding picture data composing the interlace image data to generate first encoded data and decoding and recomposing the first encoded data to generate recomposed image data, an up sample processing means for up sampling the recomposed image data generated by the first encoding means to generate image data having the same resolution as that of the progressive image data, and a second encoding means for encoding picture data composing the progressive image data using the image data generated by the up sample processing means as predictive image data to generate second encoded data.

An encoding method of a second embodiment of the present invention is an encoding method for encoding progressive image data and interlace image data corresponding to the progressive image data, having a first step of encoding picture data composing the interlace image data to generate first encoded data and decoding and recomposing the first encoded data to generate recomposed image data, a second step of up sampling the recomposed image data generated at the first step to generate image data having the same resolution as that of the progressive image data, and a third step of encoding the picture data composing the progressive image data using the image data generated at the second step as predictive image data to generate second encoded data.

A program of a third embodiment of the present invention is a program executed by a computer for encoding progressive image data and interlace image data corresponding to the progressive image data, which makes the computer execute a first routine of encoding the picture data composing the interlace image data to generate first encoded data and decoding and recomposing the first encoded data to generate recomposed image data, a second routine of up sampling the recomposed image data generated at the first routine to generate image data having the same resolution as that of the progressive image data, and a third routine of encoding the picture data composing the progressive image data using the image data generated in the second routine as predictive image data to generate second encoded data.

A decoding apparatus of a fourth embodiment of the present invention is a decoding apparatus for decoding first encoded data obtained by encoding progressive image data and second encoded data obtained by encoding interlace image data corresponding to the progressive image data, having a first decoding unit configured to decode the second encoded data, an up sample processing unit configured to interpolate first predictive image data generated by the decoding in the first decoding unit to generate second predictive image data, and a second decoding unit configured to decode the first encoded data based on the second predictive image data generated at the up sample processing unit.

Further, according to the present invention, there is provided a decoding apparatus for decoding first encoded data obtained by encoding progressive image data and second encoded data obtained by encoding interlace image data corresponding to the progressive image data, having a first decoding means for decoding the second encoded data, an up sample processing means for interpolating first predictive image data generated by the decoding in the first decoding means to generate second predictive image data, and a second decoding means for decoding the first encoded data based on the second predictive image data generated at the up sample processing means.

A decoding method of a fifth embodiment of the present invention is a decoding method for decoding first encoded data obtained by encoding progressive image data and second encoded data obtained by encoding interlace image data corresponding to the progressive image data, having a first step of decoding the second encoded data, a second step of interpolating the first predictive image data generated by the decoding at the first step to generate second predictive image data, and a third step of decoding the first encoded data based on the second predictive image data generated at the second step.

A program of a sixth embodiment of the present invention is a program executed by a computer for decoding first encoded data obtained by encoding progressive image data and second encoded data obtained by encoding interlace image data corresponding to the progressive image data, which makes the computer execute a first routine of decoding the second encoded data, a second routine of interpolating the first predictive image data generated by the decoding at the first routine to generate second predictive image data, and a third routine of decoding the first encoded data based on the second predictive image data generated at the second routine.

Effect of the Invention

According to the present invention, it is possible to provide an encoding device, an encoding method, and a program enabling encoding of progressive image data in the upper layer and encoding of interlace image data in the lower layer when performing layered encoding.

Further, according to the present invention, it is possible to provide a decoding device, a decoding method, and a program able to decode the progressive image data encoded in the upper layer and the interlace image data encoded in the lower layer.

BRIEF DESCRIPTION OF THE DRAWINGS

FIGS. 6A and 6B are diagrams for explaining an example of processing of an intra-field predictive image generation circuit shown in FIG. 5.

FIG. 7 is a flow chart for explaining an example of the processing of an intra-frame predictive image generation circuit shown in FIG. 5.

FIGS. 8A and 8B are diagrams for explaining an example of the processing of the intra-field predictive image generation circuit shown in FIG. 5.

FIGS. 9A and 9B are diagrams for explaining an example of the processing of the intra-frame predictive image generation circuit shown in FIG. 5.

DESCRIPTION OF NOTATIONS

1 . . . encoding and/or decoding system, 2 . . . encoding device, 3 . . . decoding device, 10 . . . layering circuit, 11 . . . delay circuit, 12 . . . lower layer encoding circuit, 13 . . . transform circuit, 14 . . . upper layer encoding circuit, 15 . . . multiplex circuit, 21 . . . intra-field predictive image generation circuit, 22 . . . intra-frame predictive image generation circuit, 23, 123 . . . screen rearrangement circuits, 31, 131 . . . processing circuits, 32, 132 . . . orthogonal transform circuits, 33, 133 . . . quantization circuits, 34, 134 . . . rate control circuits, 35, 135 . . . reversible encoding circuits, 36, 136 . . . buffer memories, 37, 137 . . . inverse quantization circuits, 38, 138 . . . inverse orthogonal transform circuits, 39, 139 . . . adder circuits, 40, 140 . . . deblock filters, 41, 141 . . . frame memories, 42, 142 . . . intra-prediction circuits, 43, 143 . . . motion prediction and/or compensation circuits, 51 . . . demultiplex circuit, 52 . . . delay circuit, 53 . . . lower layer decoding circuit, 54 . . . transform circuit, 55 . . . upper layer decoding circuit, 56 . . . recomposing circuit, 60, 160 . . . storage buffers, 61, 161 . . . reversible decoding circuits, 62, 162 . . . inverse quantization circuits, 63, 163 . . .

inverse orthogonal transform circuits, 64, 164 . . . adder circuits, 65, 165 . . . deblock filters, 66, 166 . . . frame memories, 67, 167 . . . screen rearrangement buffers, 69, 169 . . . intra-prediction circuits, 70, 170 . . . motion prediction and/or compensation circuits, and 145 . . . lower layer prediction circuit.

BEST MODE FOR CARRYING OUT THE INVENTION

Figure 1:
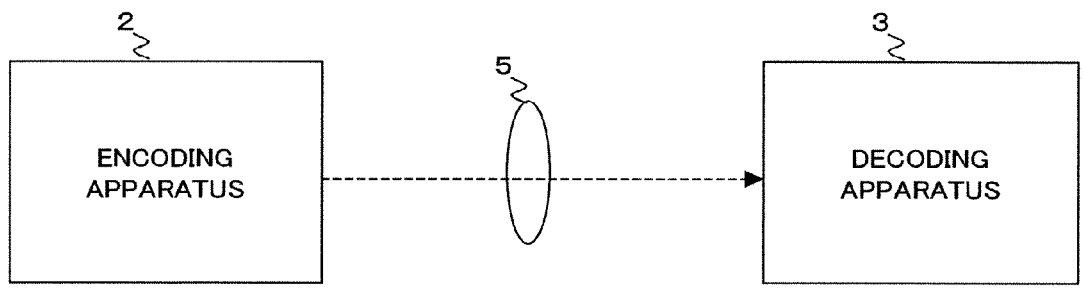
FIG. 1 is a diagram showing an example of the configuration of an encoding and/or decoding system of an embodiment of the present invention.

FIG. 1 is a conceptual diagram of an encoding and/or decoding system of the present embodiment.

An encoding and/or decoding system 1 has an encoding apparatus 2 provided on a transmission side and a decoding apparatus 3 provided on a reception side.

In the encoding and/or decoding system 1, the encoding apparatus 2 on the transmission side compresses (encodes) image data by a Discrete Cosine Transform (DCT), Karunen Loewe transform, or other orthogonal transform and motion compensation to generate frame encoded image data (bit stream), modulates the frame encoded image data, then transmits the same via a satellite broadcast wave, cable TV network, telephone line network, mobile phone line network, or other a transmission medium 5.

On the reception side, the decoding apparatus 3 receives the encoded image signal, demodulates it, then expands it by an inverse transform to the orthogonal transform at the time of the above modulation and motion compensation to generate frame image data for use.

The transmission medium 5 is not limited to the communication networks explained above and may be an optical disc, magnetic disc, semiconductor memory, or other storage medium.

Figure 2:
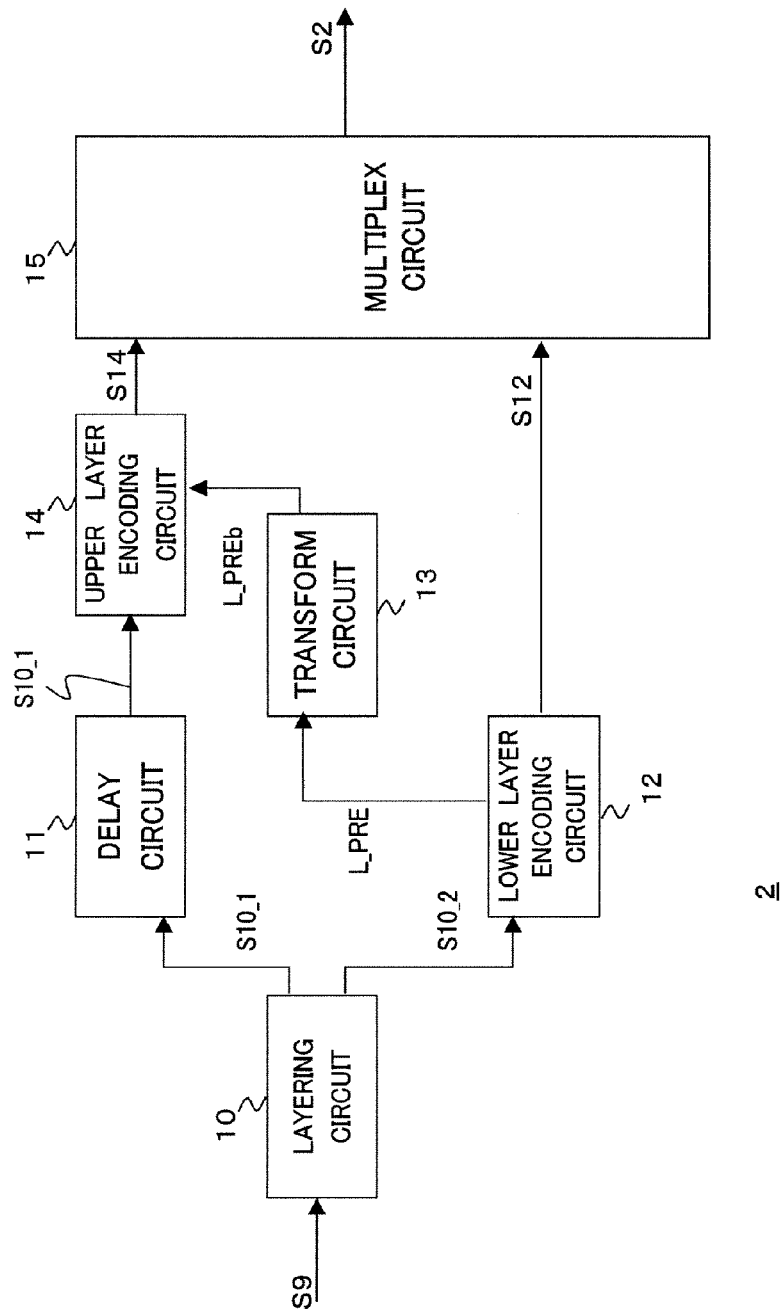
FIG. 2 is a block diagram of an encoding apparatus in the encoding and/or decoding system shown in FIG. 1.

In the present embodiment, for example, as shown in FIG. 2, a layering circuit 10 is configured to generate progressive image data (progressive image signal) S10_1 and interlace image data S10_2 based on image data S9 to be encoded.

A lower layer encoding circuit 12 is configured to encode the interlace image data S10_2 to generate lower layer encoded data S12.

A transform circuit 13 is configured to interpolate (up sample) a lower layer predictive image data L_PRE generated by the lower layer encoding circuit 12 to generate lower layer predictive image data L_PREb having the same resolution (number of scanning lines) as that of the progressive image data S10_1 and output this to an upper layer encoding circuit 14.

The upper layer encoding circuit 14 is configured to encode the progressive image data S10_1 based on the lower layer predictive image data L_PREb to generate upper layer encoded data S14.

<Encoding Device>

Referring to FIG. 1, the encoding apparatus 2 will be explained.

FIG. 2 is a diagram showing an example of the overall configuration of the encoding apparatus 2.

The encoding apparatus 2 has for example a layering circuit 10, delay circuit 11, lower layer encoding circuit 12, transform circuit 13, upper layer encoding circuit 14, and multiplex circuit 15.

[Layering Circuit]

The layering circuit 10 is, for example as shown in FIG. 2, configured to generate the progressive image data progressive image signal) S10_1 and the interlace image data S10_2 based on the image data S9 to be encoded. Further, the layering circuit 10 is configured to write the picture data FR1 to FR6 composing the above generated progressive image data S10_1 into the delay circuit 11.

The progressive image data S10_1 is for example 60 frames/sec (60 p).

Further, the layering circuit 10 is configured to output the picture data FI1 to FI6 composing the above generated index image data S10_2 to the lower layer encoding circuit 12.

The interlace image data S10_2 is for example 60 fields/sec (60 i).

[Delay Circuit]

The delay circuit 11 is configured to delay the picture data composing the progressive image data (progressive signal) S10_1 input from the layering circuit 10 by for example exactly the processing time in the lower layer encoding circuit 12 and transform circuit 13 and output the result to the upper layer encoding circuit 14.

[Lower Layer Encoding Circuit]

The lower layer encoding circuit 12 is configured to encode the interlace image data S10_2 input from the layering circuit 10 to generate the lower layer encoded data S12 and output this to the multiplex circuit 15. Further, the lower layer encoding circuit 12 is configured to generate the lower predictive image data L_PRE in the above encoding and output this to the transform circuit 13.

Figure 4:
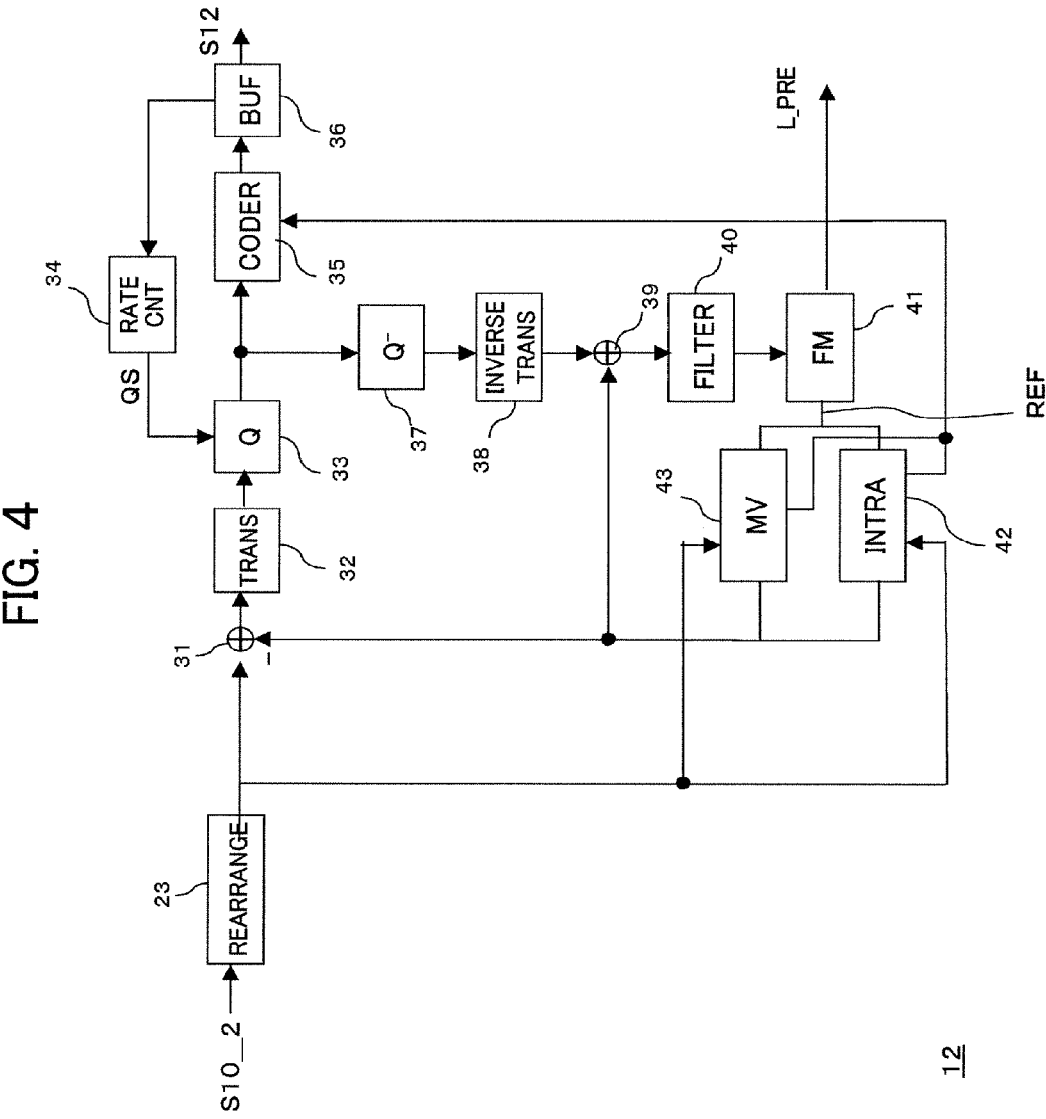
FIG. 4 is a diagram for explaining an example of the configuration of a lower layer encoding circuit shown in FIG. 2.

FIG. 4 is a diagram showing an example of the configuration of the lower layer encoding circuit 12.

The lower layer encoding circuit 12 has for example a screen rearrangement circuit 23, processing circuit 31, orthogonal transform circuit 32, quantization circuit 33, rate control circuit 34, reversible encoding circuit 35, buffer memory 36, inverse quantization circuit 37, inverse orthogonal transform circuit 38, adder circuit 39, deblock filter 40, frame memory 41, intra-prediction circuit 42, and motion prediction and/or compensation circuit 43.

The screen rearrangement circuit 23 is for example configured to rearrange the progressive image data S10_2 input from the layering circuit 10 shown in FIG. 2 to a sequence of encoding in accordance with a GOP (Group Of Pictures) structure comprised by picture types I, P, and B and output the same to the processing circuit 31, intra-prediction circuit 42, and motion prediction and/or compensation circuit 43.

The processing circuit 31 is configured to generate image data indicating a difference between the picture data to be encoded input from the screen rearrangement circuit 23 and the predictive image data PI input from the intra-prediction circuit 42 or motion prediction and/or compensation circuit 43 and output this to the orthogonal transform circuit 32.

The orthogonal transform circuit 32 is configured to apply a Discrete Cosine Transform (DCT), Karunen Loewe transform, or other orthogonal transform to the image data input from the processing circuit 31 to generate image data indicating the transform coefficient (for example DCT coefficient) and output this to the quantization circuit 33.

The quantization circuit 33 is configured to quantize the image data (transform coefficient before quantization) input from the orthogonal transform circuit 32 based on a quantization scale QS input from the rate control circuit 34 to generate image data indicating the transform coefficient after the quantization and output this to the reversible encoding circuit 35 and the inverse quantization circuit 37.

The rate control circuit 34 is for example configured to generate the quantization scale QS based on the image data read out from the buffer memory 36 and output this to the quantization circuit 33.

The reversible encoding circuit 35 is configured to store the image data obtained by variable length encoding of the image data input from the quantization circuit 33 in the buffer memory 36. Further, the reversible encoding circuit 35 is configured to store a motion vector MV input from the motion prediction and/or compensation circuit 43 or a differential motion vector thereof, discrimination data of reference image data, and an intra-prediction mode input from the intra-prediction circuit 42 in header data etc.

The image data stored in the buffer memory 36 is read out as the lower encoded data S12 to the multiplex circuit 15 shown in FIG. 2.

The inverse quantization circuit 37 is configured to apply the inverse quantization processing corresponding to the quantization of the quantization circuit 33 to the image data from the quantization circuit 33, generate the data obtained by that, and output this to the inverse orthogonal transform circuit 38.

The inverse orthogonal transform circuit 38 is configured to apply the inverse transform to the orthogonal transform in the orthogonal transform circuit 32 to the data input from the inverse quantization circuit 37 and output the thus generated image data to the adder circuit 39.

The adder circuit 39 is configured to add the image data input (decoded) from the inverse orthogonal transform circuit 38 and the predictive image data PI input from the intra-prediction circuit 42 or the motion prediction and/or compensation circuit 43 and output this to the deblock filter 40.

The deblock filter 40 is configured to eliminate block distortion of the reference picture data input from the adder circuit 39 and write the result into the frame memory 41.

The reference picture data written in the frame memory 41 is read out from the frame memory 41 as the lower predictive image data L_PRE and output to for example the transform circuit 13 shown in FIG. 2.

The intra-prediction circuit 42 is configured to determine the intra-prediction mode and block size of the prediction block so that a residue becomes the minimum in a macro block to be intra-coded.

The intra-prediction circuit 42 uses 4×4 and 16×16 pixels as the block size.

The intra-prediction circuit 42 is configured to output predictive image data PI according to intra-prediction to the processing circuit 31 and the adder circuit 39 when intra-prediction is selected.

The motion prediction and/or compensation circuit 43 is configured to perform the motion prediction based on the reference picture data REF which has already been encoded, then locally decoded and stored in the frame memory 41 and determine the motion vector and the block size of the motion compensation for minimizing the residue.

The motion prediction and/or compensation circuit 43 uses, as the block size, 16×16, 16×8, 8×16, 8×8, 8×4, 4×8, and 4×4 pixels.

The motion prediction and/or compensation circuit 43 is configured to output predictive image data PI according to inter-prediction to the processing circuit 31 and the adder circuit 39 when inter-prediction is selected.

[Transform Circuit]

Referring to FIG. 2, the transform circuit 13 will be explained.

The transform circuit 13 is configured to interpolate the lower predictive image data L_PRE input from the lower layer encoding circuit 12, generate the lower predictive image data L_PREb having the same resolution (number of scanning lines) as that of the progressive image data S10_1 input from the delay circuit 11 by the upper layer encoding circuit 14, and output this to the upper layer encoding circuit 14.

Figure 5:
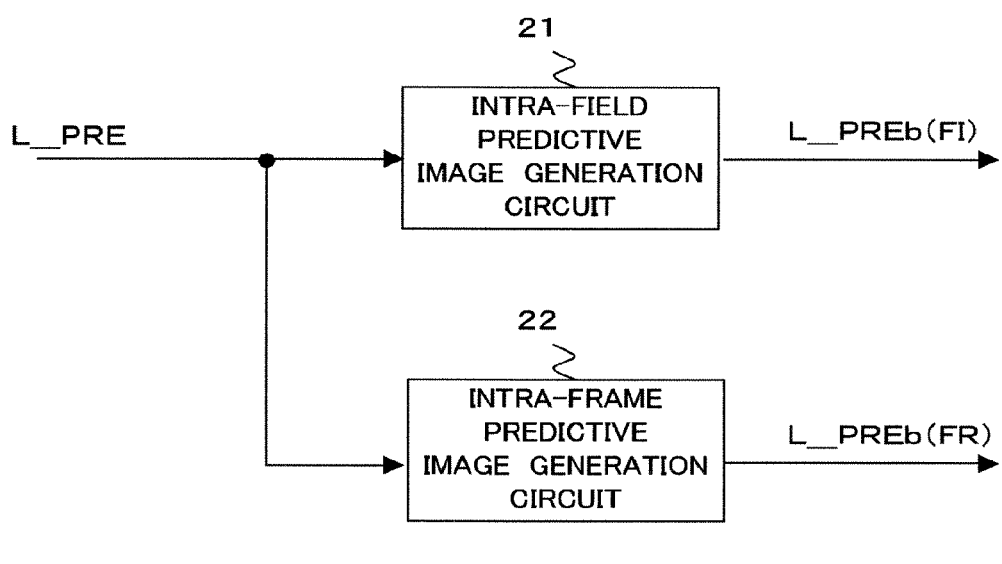
FIG. 5 is a diagram for explaining an example of the configuration of a transform circuit shown in FIG. 2.

FIG. 5 is a diagram showing an example of the configuration of the transform circuit 13.

The transform circuit 13 has for example an intra-field predictive image generation circuit 21 and intra-frame predictive image generation circuit 22.

Before the explanation of the processing content of the transform circuit 13, the terms used in the present embodiment will be defined as follows.

Figure 3:
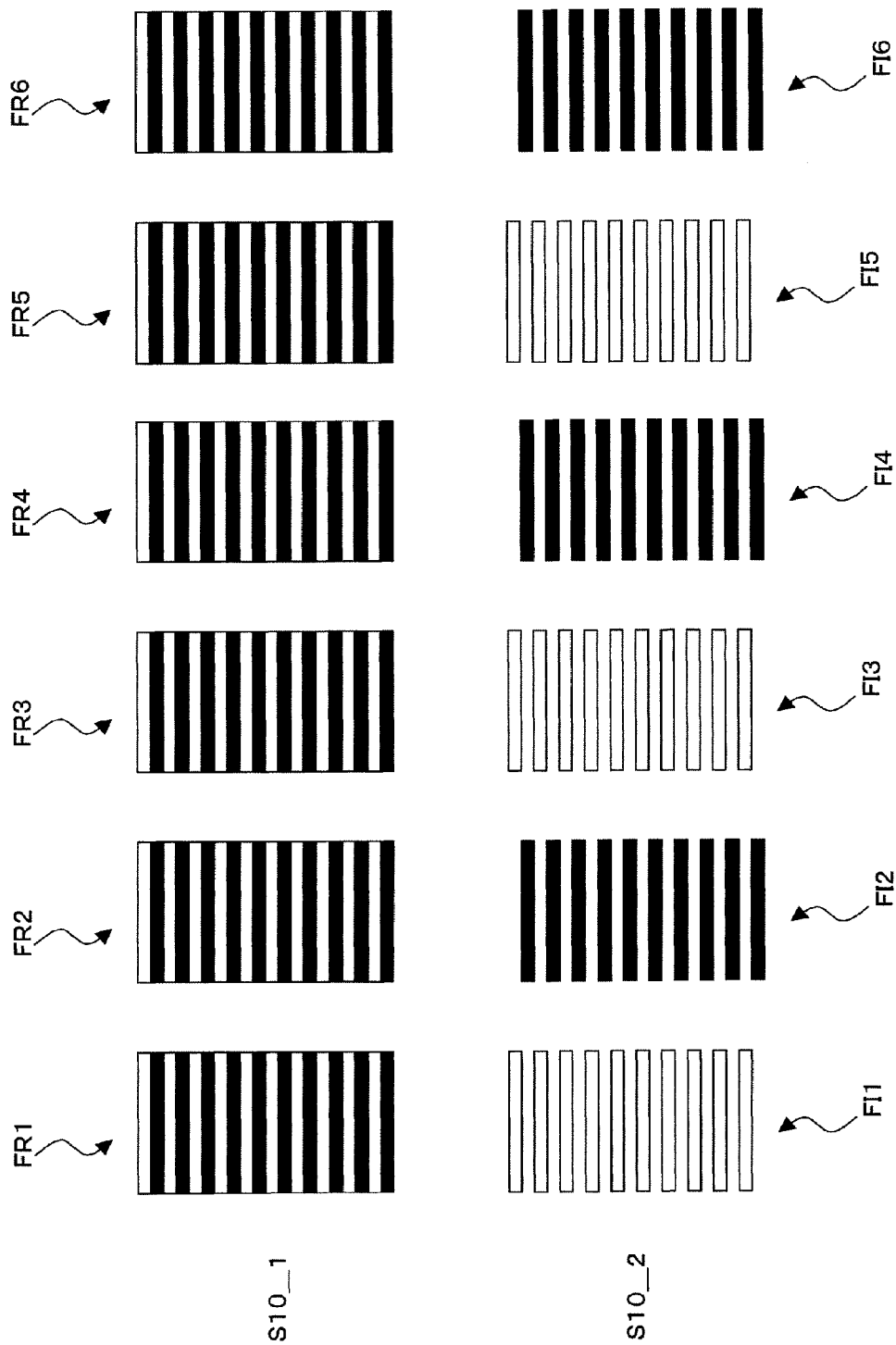
FIG. 3 is a diagram for explaining progressive image data and interlace image data shown in FIG. 2.

For example, field picture data Y of the interlace image data S10_2 having the same time stamp as that of a frame picture data X of the progressive image data S10_1 will be called the "base picture data of the picture data X". In the example of FIG. 3, the field picture data FI1 is the base picture data of the frame picture data FR1.

One base block MBY corresponding to the macro block MBX of the frame picture data X of the progressive image data S10_1 is present in the base picture data of the frame picture data X, that is, the field picture data Y.

The base block MBY has a width of the same length and a height of half that of the macro block MBX.

Here, where the pixel is located at a spatial position (xP, yP) of the top left pixel position of the base block MBX relative to the top left pixel position of the frame picture data X, the top left pixel position of the base block MBY is located at a spatial position (xP, yP/2).

Top field data and bottom field data continuing after that will be called a "complementary field pair".

In one complementary field pair, the top field data is the complementary field data of the bottom field data in the same pair, and the bottom field data is the complementary field data of the top field data in the same pair. For example, in FIG. 3, the complementary field pair is comprised of the field data FI1 and FI2, the field data FI2 is the complementary field data of the field data FI1, and the field data FI1 is the complementary field data of the field data FI2.

The field data A and B composing a complementary field pair will be considered next.

In a case where the top left pixel position of a block MBA has a spatial position (x_PA, yP_A) relative to the top left pixel position of the field data A, and the top left pixel position of a block MBB has a spatial position (xP_B, yP_B) relative to the top left pixel position of the field data B, where the blocks MBA and MBB have the same size, and the spatial position (xP_A, yP_A) and the spatial position (xP_B, yP_B) are the same, the block MBA is the complementary block of the block MBB, and the block MBB is the complementary block of the block MBA.

When the lower predictive image data L_PRE input from the lower layer encoding circuit 12 is the top field data, the intra-field predictive image generation circuit 21 performs the up sample processing for the base block data in the lower predictive image data L_PRE corresponding to the macro block MB to be encoded (current) using only the top field data thereof as shown in FIG. 6A to generate the lower predictive image data L_PREb(FI) having the same resolution as that of the progressive image data S10_1.

When the lower predictive image data L_PRE input from the lower layer encoding circuit 12 is the bottom field data, the intra-field predictive image generation circuit 21 performs the up sample processing of the base block data in the lower predictive image data L_PRE corresponding to the macro block MB to be encoded using only the bottom field data thereof as shown in FIG. 6B to generate the lower predictive image data L_PREb(FI) having the same resolution as that of the progressive image data S10_1.

FIG. 7 is a flow chart for explaining an example of the processing of the intra-field predictive image generation circuit 21 shown in FIG. 5. The intra-field predictive image generation circuit 21 is configured to perform the following processing.

In the following explanation, the number of lines of the base block data in the lower predictive image data L_PRE is defined as N. Further, the i-th line data of the base block data is defined as Base[i]. Here, i is an integer of "0" to "N−1".

Steps ST12 to ST15 shown in FIG. 7 indicate the up sample processing of the top field shown in FIG. 6A and FIG. 8A, and steps ST16 to ST19 shown in FIG. 7 indicate the up sample processing of the bottom field shown in FIG. 63 and FIG. 8B.

Step ST11:
The intra-field predictive image generation circuit 21 proceeds to step ST12 when the lower predictive image data L_PRE input from the lower layer encoding circuit 12 is the top field data and proceeds to step ST16 when the data is not the top field data.

Step ST12:
The intra-field predictive image generation circuit 21 copies the i-th line data Base[i] of the base block data to the 2i-th line data PRED [2i] of the corresponding prediction block data in the lower predictive image data L_PREb.

Namely, the intra-field predictive image generation circuit 21 generates line data PRED [0], [2], . . . , [2N−2] by the above copy.

Step ST13:
The intra-field predictive image generation circuit 21 defines the line data lower than the lowermost line of the above base block data by one as the line data Base[N].

Step ST14:
The intra-field predictive image generation circuit 21 stores the line data Base[N] obtained at step ST13 in the line data PRED[2N].

Step ST15:
The intra-field predictive image generation circuit 21 adds the line data PRED[2i] multiplied with a weighting w1 and the line data PRED[2i+2] multiplied with a weighting w2 according to the following Equation (1) to generate the 2i+1-th line data PRED[2i+1] of the corresponding prediction block data in the lower predictive image data L_PREb.

$$PRED[2i+1]=w1*PRED[2i]+w2*PRED[2i+2] \quad (1)$$

Step ST16:
The intra-field predictive image generation circuit 21 copies the i-th line data Base[i] of the base block data to the 2i+1-th line data PRED[2i+1] of the corresponding prediction block data in the lower predictive image data L_PREb.

Namely, the intra-field predictive image generation circuit 21 generates line data PRED[1], [3], . . . [2N−1] by the above copy.

Step ST17:
The intra-field predictive image generation circuit 21 defines the line data one higher than the uppermost line of the above base block data as the line data Base[−1].

Step ST18:
The intra-field predictive image generation circuit 21 stores the line data Base[−1] obtained at step ST17 in the line data PRED[−1].

Step ST19:
The intra-field predictive image generation circuit 21 adds the line data PRED[2i−1] multiplied with the weighting w1 and the line data PRED[2i+1] multiplied with the weighting w2 according to the following Equation (2) to generate the 2i-th line data PRED[2i] of the corresponding prediction block data in the lower predictive image data L_PREb.

$$PRED[2i]=w1*PRED[2i-1]+w2*PRED[2i+1] \quad (2)$$

Step ST20:
The intra-field predictive image generation circuit 21 outputs the line data PRED[i] generated at step ST15 and step ST19 as the lower predictive image data L_PREb(FI) to the upper layer encoding circuit 14.

Referring to FIG. 5, the intra-frame predictive image generation circuit 22 will be explained.

When the lower predictive image data L_PRE input from the lower layer encoding circuit 12 is the top field data, as shown in FIG. 9A, the intra-frame predictive image generation circuit 22 is configured to perform the up sample processing using the base block data Base in the lower predictive image data L_PRE (top field data) corresponding to the macro block MB to be encoded (current) and complementary block data Comp (bottom field data) of the base block data to generate lower predictive image data L_PREb(FR) having the same resolution as that of the progressive image data S10_1.

Further, when the lower predictive image data L_PRE input from the lower layer encoding circuit 12 is the bottom field data, as shown in FIG. 9B, the intra-frame predictive image generation circuit 22 is configured to perform the up sample processing using the base block data Base in the lower predictive image data L_PRE (bottom field data) corresponding to the macro block MB to be encoded (current) and complementary block data Comp (top field data) of the base block data to generate the lower predictive image data L_PREb(FR) having the same resolution as that of the progressive image data S10_1.

Figure 10:
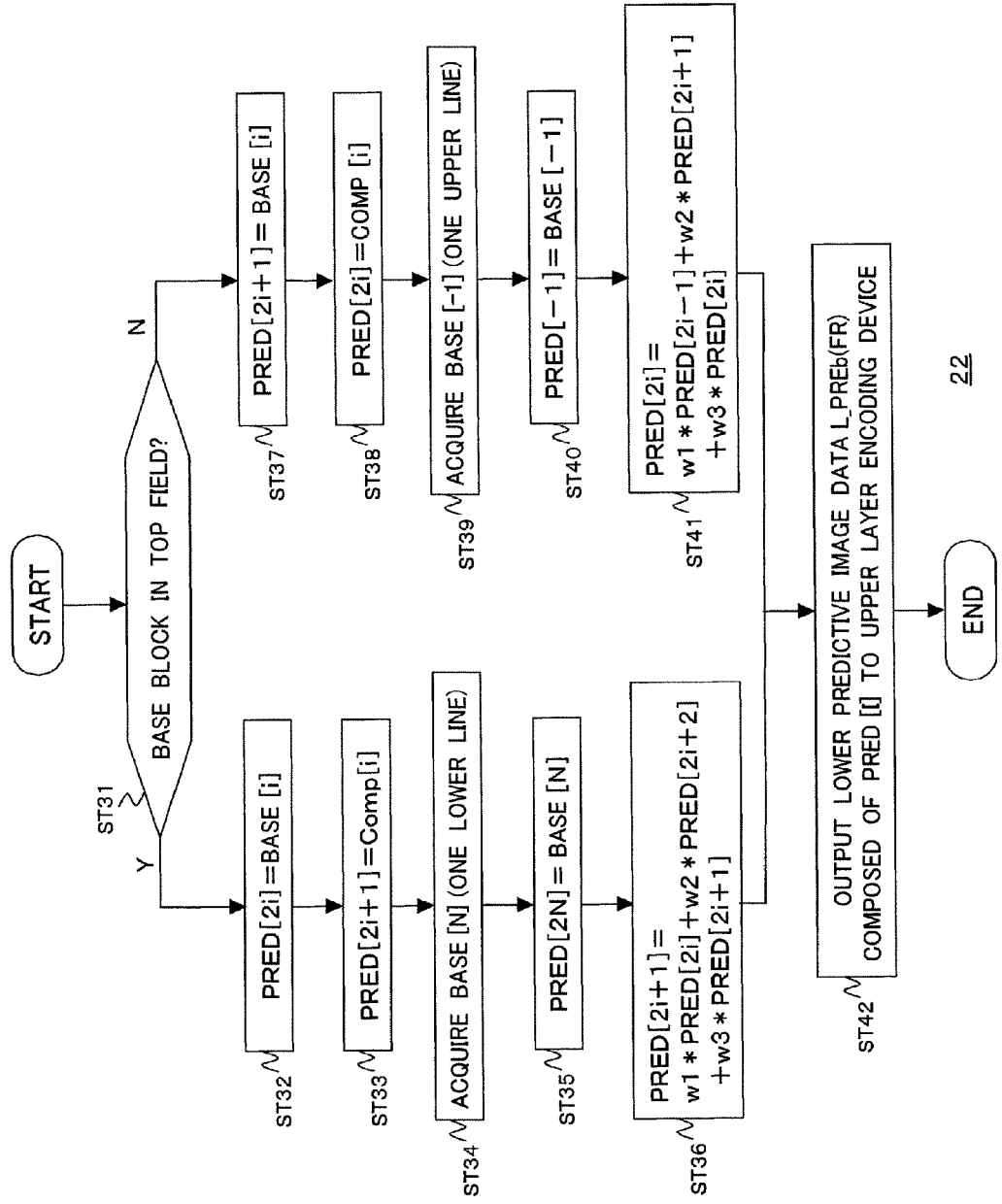
FIG. 10 is a flow chart for explaining an example of the processing of the intra-frame predictive image generation circuit shown in FIG. 5.

FIG. 10 is a flow chart for explaining an example of the processing of the intra-frame predictive image generation circuit 22 shown in FIG. 5.

In the following explanation, the number of lines of the base block data in the lower predictive image data L_PRE is defined as N. Further, the i-th line data of the base block data is defined as Base[i]. Here, i is an integer of "0" to "N−1".

Figure 11:
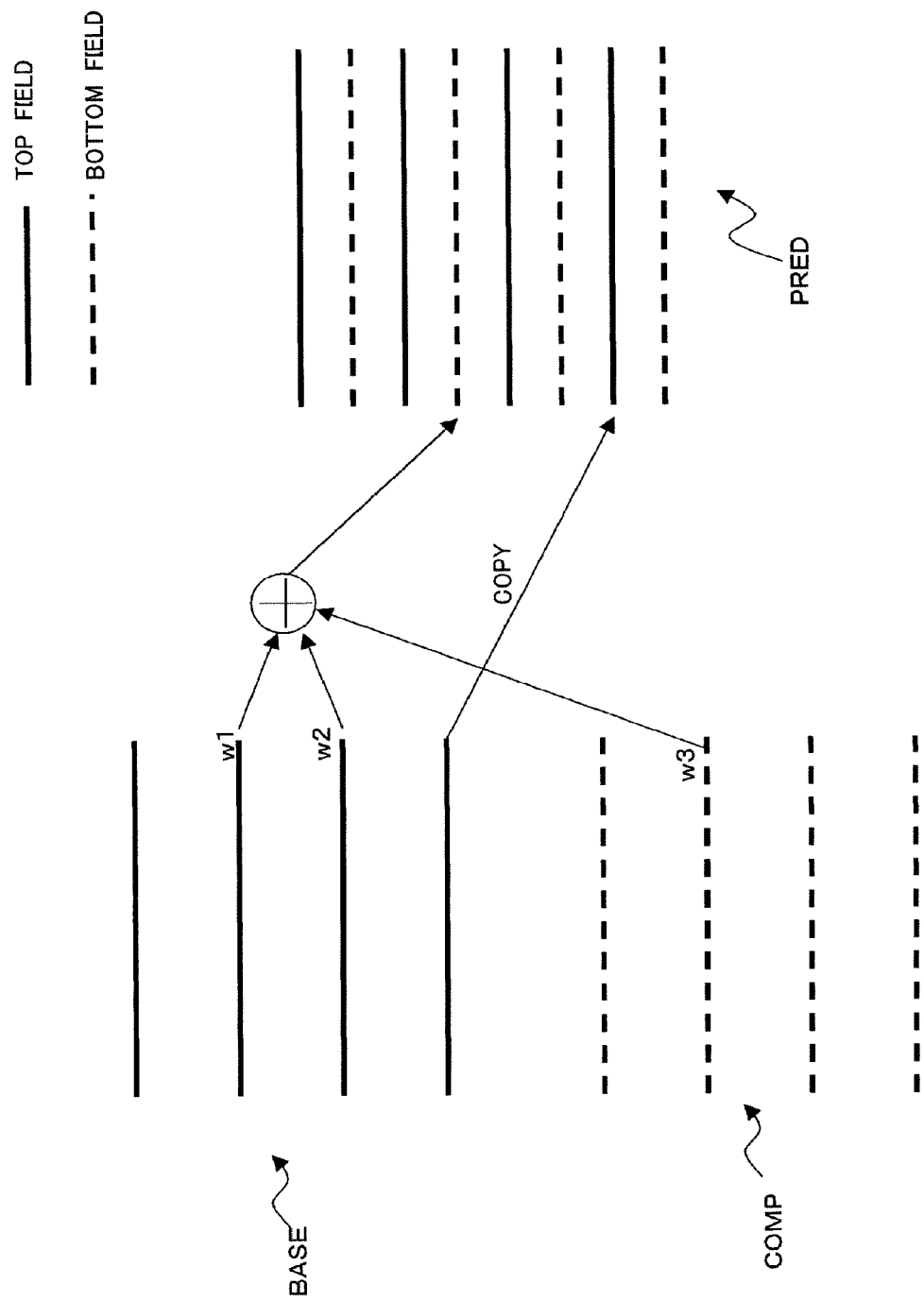
FIG. 11 is a flow chart for explaining an example of the processing of the intra-frame predictive image generation circuit shown in FIG. 5.
Figure 12:
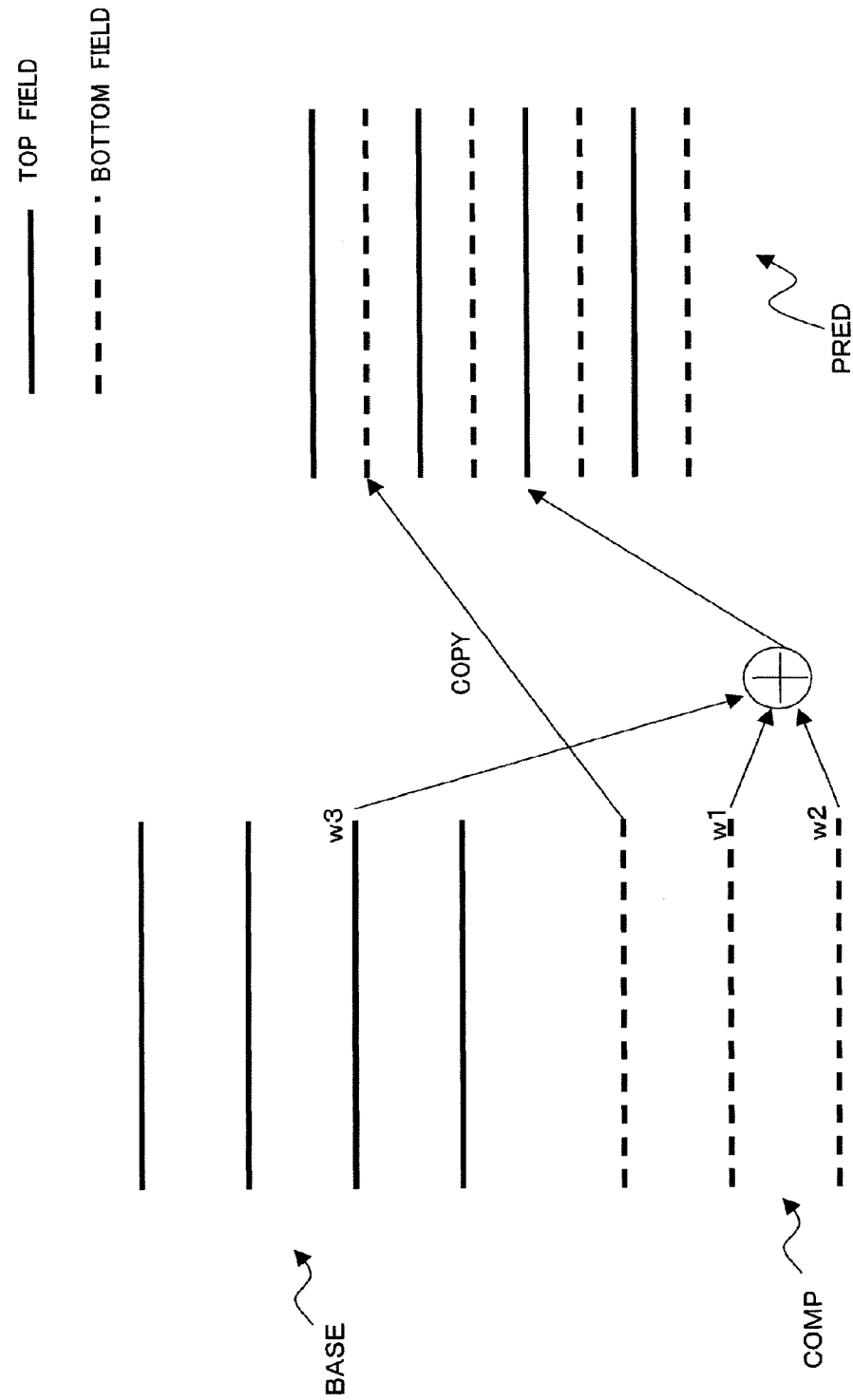
FIG. 12 is a flow chart for explaining an example of the processing of the intra-frame predictive image generation circuit shown in FIG. 5.

Steps ST32 to ST36 shown in FIG. 10 indicate the up sample processing of the top field shown in FIG. 9A and FIG. 11, and steps ST37 to ST41 shown in FIG. 10 indicate the up sample processing of the bottom field shown in FIG. 9B and FIG. 12.

Step ST31:
The intra-frame predictive image generation circuit 22 proceeds to step ST32 when the lower predictive image data L_PRE input from the lower layer encoding circuit 12 is the top field data, and proceeds to step ST37 when the data is not the top field data.

Step ST32:
The intra-frame predictive image generation circuit 22 copies the i-th line data Base[i] of the base block data to the 2i-th line data PRED [2i] of the corresponding prediction block data in the lower predictive image data L_PREb.

Namely, the intra-frame predictive image generation circuit 22 generates line data PRED [0], [2], . . . , [2N−2] by the above copy.

Step ST33:
The intra-frame predictive image generation circuit 22 enters the i-th line data Comp[i] of the complementary block data corresponding to the base block data into the 2i+1-th line data PRED[2i+1].

Step ST34:
The intra-field predictive image generation circuit 21 defines line data one lower than the lowermost line of the above base block data as the line data Base[N].

Step ST35:

The intra-field predictive image generation circuit 21 stores the line data Base[N] obtained at step ST34 in the line data PRED[2N].

Step ST36:

The intra-field predictive image generation circuit 21 adds the line data PRED[2i] multiplied with the weighting w1, the line data PRED[2i+2] multiplied with the weighting w2, and the line data PRED[2i+1] multiplied with the weighting w3 according to the following Equation (3) to generate the 2i+1-th line data PRED[2i+1] of the corresponding prediction block data in the lower predictive image data L_PREb.

$$PRED[2i+1]=w1*PRED[2i]+w2*PRED[2i+2]+w3*PRED[2i+1] \quad (3)$$

Step ST37:

The intra-field predictive image generation circuit 21 copies the i-th line data Base[i] of the base block data to the 2i+1-th line data PRED[2i+1] of the corresponding prediction block data in the lower predictive image data L_PREb.

Namely, the intra-field predictive image generation circuit 21 generates line data PRED[1], [3], . . . , [2N−1] by the above copy.

Step ST38:

The intra-frame predictive image generation circuit 22 substitute the i-th line data Comp[i] of the complementary block data corresponding to the base block data in the 2i-th line data PRED[2i].

Step ST39:

The intra-frame predictive image generation circuit 22 defines line data one higher than the uppermost line of the above base block data as the line data Base[−1].

Step ST40:

The intra-frame predictive image generation circuit 22 stores the line data Base[−1] obtained at step ST39 in the line data PRED[−1].

Step ST41:

The intra-frame predictive image generation circuit 22 adds the line data PRED[2i−1] multiplied with the weighting w1, the line data PRED[2i+1] multiplied with the weighting w2, and the line data PRED[2i] multiplied with the weighting w3 according to the following Equation (4) to generate the 2i-th line data PRED[2i] of the corresponding prediction block data in the lower predictive image data L_PREb.

$$PRED[2i]=w1*PRED[2i-1]+w2*PRED[2i+1]+w3*PRED[2i] \quad (4)$$

Step ST42:

The intra-frame predictive image generation circuit 22 outputs the line data PRED[i] of the prediction block data generated at step ST36 and step ST41 as the lower predictive image data L_PREb(FR) to the upper layer encoding circuit 14.

[Upper Layer Encoding Circuit]

The upper layer encoding circuit 14 is configured to encode the progressive image data S10_1 using the lower predictive image data L_PREb generated in the lower layer encoding circuit 12 input from the transform circuit 13 to generate the upper encoded data 514.

Figure 13:
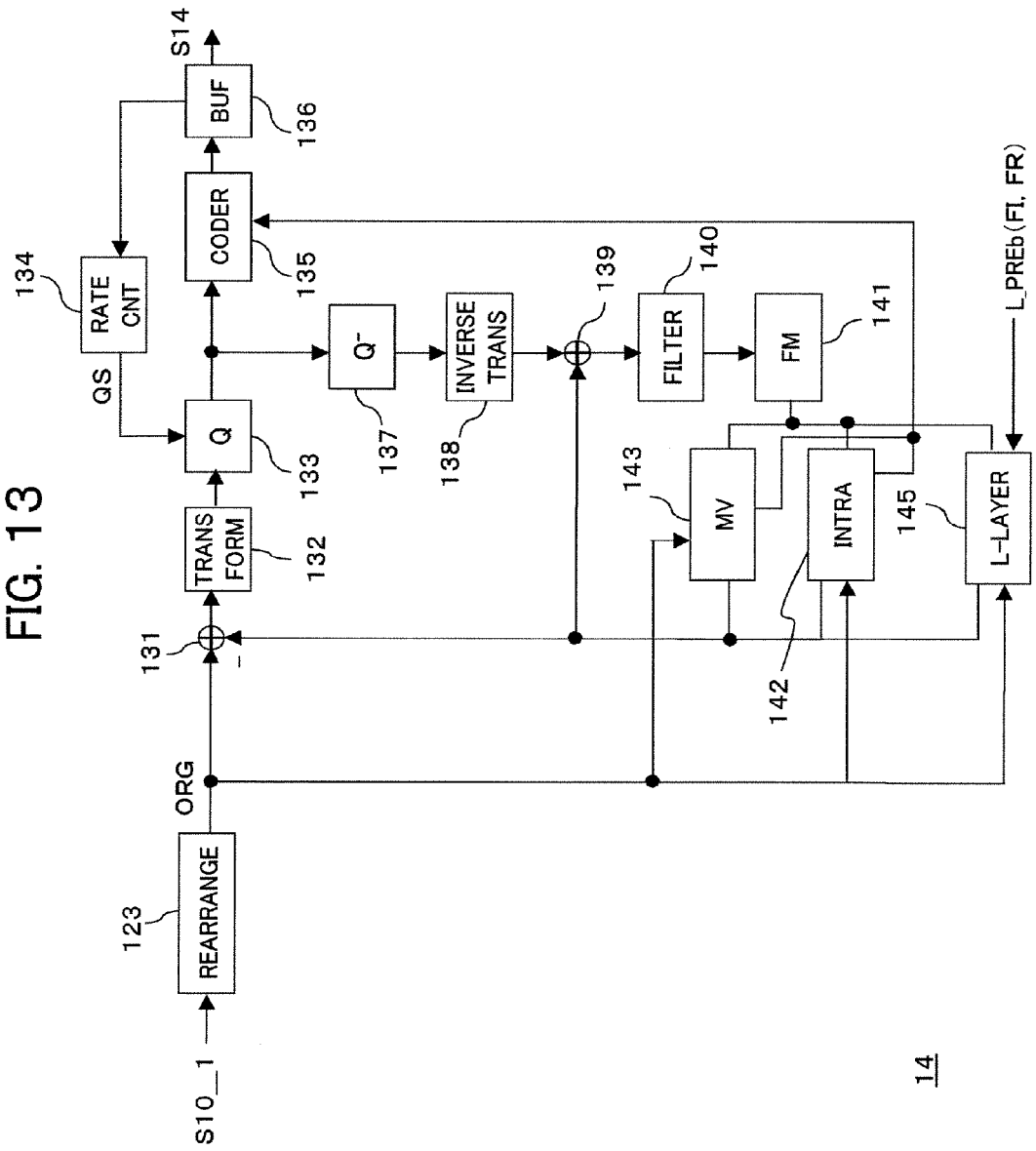
FIG. 13 is a diagram showing an example of the configuration of an upper layer encoding circuit shown in FIG. 2.

FIG. 13 is a diagram showing an example of the configuration of the upper layer encoding circuit 14. The upper layer encoding circuit 14 has for example a screen rearrangement circuit 123, processing circuit 131, orthogonal transform circuit 132, quantization circuit 133, rate control circuit 134, reversible encoding circuit 135, buffer memory 136, inverse quantization circuit 137, inverse orthogonal transform circuit 138, adder circuit 139, deblock filter 140, frame memory 141, intra-prediction circuit 142, and motion prediction and/or compensation circuit 143.

The screen rearrangement circuit 123 is for example configured to rearrange the picture data of the progressive image data S10_1 read out from the delay circuit 11 shown in FIG. 2 to the sequence of encoding in accordance with the GOP structure comprised by picture types I, P, and B, and output the same as the picture data ORG to be encoded to the processing circuit 131, the intra-prediction circuit 142, and the motion prediction and/or compensation circuit 143.

The processing circuit 131 is configured to generate image data indicating the difference between the picture data to be encoded input from the screen rearrangement circuit 123 and the predictive image data PI input from the motion prediction and/or compensation circuit 143 or the lower layer prediction circuit 145 and output this to the orthogonal transform circuit 132.

The orthogonal transform circuit 132 is configured to apply a Discrete Cosine Transform, Karunen Loewe transform, or other orthogonal transform to the image data input from the processing circuit 131 to generate image data indicating the transform coefficient (for example DCT coefficient) and output this to the quantization circuit 133.

The quantization circuit 133 is configured to quantize the image data (transform coefficient before quantization) input from the orthogonal transform circuit 132 based on the quantization scale QS input from the rate control circuit 134 to generate the image data indicating the transform coefficient after quantization, and output this to the reversible encoding circuit 135 and the inverse quantization circuit 137.

The rate control circuit 134 is for example configured to generate the quantization scale QS based on the image data read out from the buffer memory 136, and output this to the quantization circuit 133.

The reversible encoding circuit 135 is configured to store the image data obtained by variable length encoding of the image data input from the quantization circuit 133 in the buffer memory 136. At this time, the reversible encoding circuit 135 stores attribute data EisTop and ETime input from the layering circuit 10 in the header data etc. Further, the reversible encoding circuit 135 stores the motion vector MV input from the motion prediction and/or compensation circuit 143 or the differential motion vector thereof, the discrimination data of the reference image data, and the intra-prediction mode input from the intra-prediction circuit 142 in the header data etc.

The image data stored in the buffer memory 136 is read out as the upper encoded data S14 to the multiplex circuit 15 shown in FIG. 2.

The inverse quantization circuit 137 is configured to apply the inverse quantization processing corresponding to the quantization of the quantization circuit 133 to the image data from the quantization circuit 133, generate the data obtained by that, and output this to the inverse orthogonal transform circuit 138.

The inverse orthogonal transform circuit 138 is configured to apply the inverse transform to the orthogonal transform in the orthogonal transform circuit 132 to the data input from the inverse quantization circuit 137 and output the thus generated image data to the adder circuit 139.

The adder circuit 139 adds the image data input (decoded) from the inverse orthogonal transform circuit 138 and the predictive image data PI input from the intra-prediction circuit 142 or the motion prediction and/or compensation circuit 143 to generate the reference (recomposed) picture data and output this to the deblock filter 40.

The deblock filter 140 is configured to eliminate the block distortion of the reference picture data input from the adder circuit 139 and write the same into the frame memory 141.

The intra-prediction circuit 142 is configured to determine the intra-prediction mode and the block size of the prediction block so that the residue becomes the minimum in the macro block to be intra-coded. The intra-prediction circuit 142 uses 4×4 and 16×16 pixels as the block size. The intra-prediction circuit 142 is configured to output the predictive image data PI by the intra-prediction to the processing circuit 131 and the adder circuit 139 where the intra-prediction is selected.

The motion prediction and/or compensation circuit 143 is configured to perfoLlu the motion prediction based on the reference picture data PEF already encoded, then locally decoded and stored in the frame memory 131 and determine the motion vector and the block size of the motion compensation for minimizing the difference of the picture data ORG to be encoded from the block data to be processed. The motion prediction and/or compensation circuit 143 uses for example any of 16×16, 16×8, 8×16, 8×8, 8×4, 4×8, and 4×4 pixels as the block size.

The motion prediction and/or compensation circuit 143 is configured to output the predictive image data PI by inter-prediction to the processing circuit 131 and the adder circuit 139 when inter-prediction is selected.

The lower layer prediction circuit 145 is configured to specify the predictive image data of the picture data ORG having a smaller difference from the block data to be processed between the lower predictive image data L_PREb(FI) and L_PREb(FR) input from the transfoLui circuit 13 shown in FIG. 2.

Figure 14:
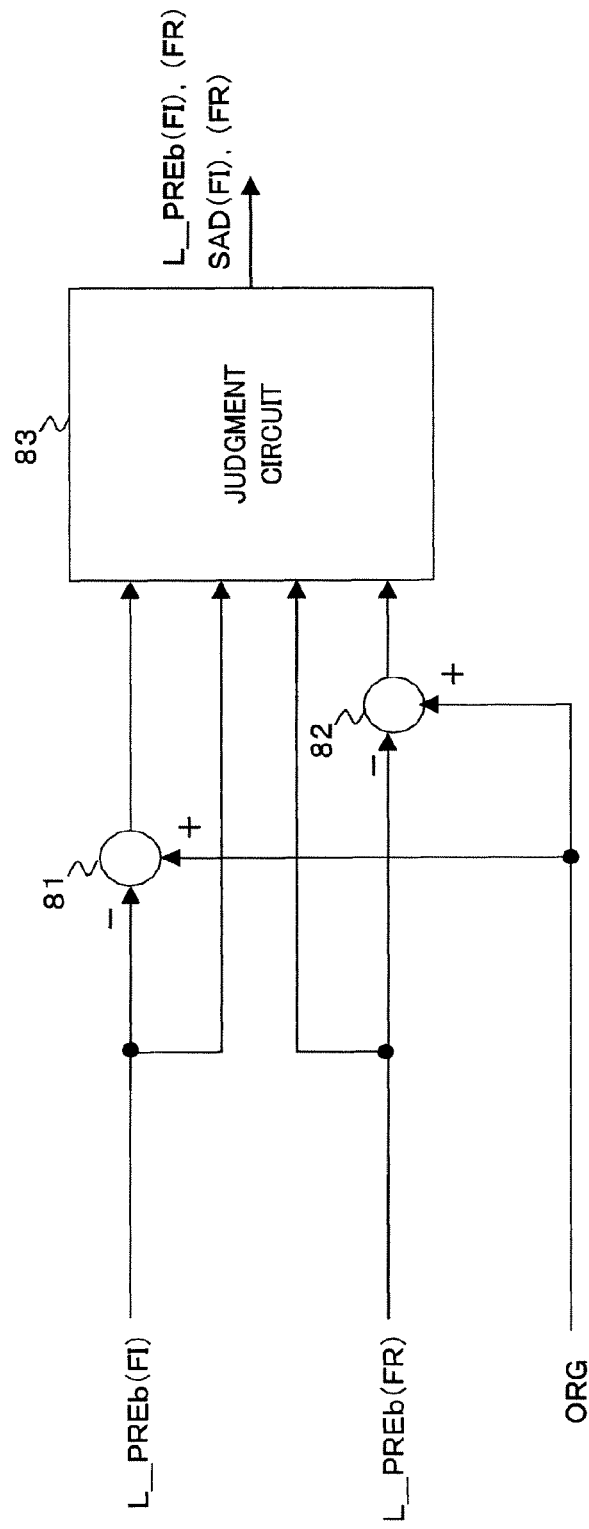
FIG. 14 is a diagram showing an example of the configuration of a lower layer prediction circuit shown in FIG. 13.

FIG. 14 is a diagram showing an example of the configuration of the lower layer prediction circuit 145.

The lower layer prediction circuit 145 has a subtractor circuit 81, subtractor circuit 82, and judgment circuit 83.

The subtractor circuit 81 is configured to generate difference data indicating the difference between the corresponding pixel data, i.e., between the lower predictive image data L_PREb(FI) input from the intra-field predictive image generation circuit 21 shown in FIG. 5 and the block data to be processed in the picture data ORG to be encoded shown in FIG. 13, and output this to the judgment circuit 83.

The subtractor circuit 82 is configured to generate difference data indicating the difference between the corresponding pixel data, i.e., between the lower predictive image data L_PREb(FR) input from the intra-frame predictive image generation circuit 22 shown in FIG. 5 and the block data to be processed in the picture data ORG to be encoded shown in FIG. 13, and output this to the judgment circuit 83.

The judgment circuit 83 is configured to store the difference data input from the subtractor circuit 81 in units of block data to generate index data SAD(FI). Further, the judgment circuit 83 is configured to store the difference data input from the subtractor circuit 82 in units of block data to generate index data SAD(FR). Then, the judgment circuit 83 is configured to specify the smaller index data between the index data SAD(FI) and the index data SAD(FR). The judgment circuit 83 is configured to output the lower predictive image data L_PREb(FI) or L_PREb(FR) corresponding to the above specified smaller index data SAD(FI) or SAD(FR) to the processing circuit 131 when the lower layer prediction circuit 145 is selected.

Predictive image data PI where the difference from the picture data ORG to be encoded becomes the smallest is selected from among the predictive image data PI generated by the intra-prediction circuit 142, the motion prediction and/or compensation circuit 143, and the lower layer prediction circuit 145 and output to the processing circuit 131.

The upper layer encoding circuit 14 is configured to store the prediction mode data PM indicating the finally selected prediction mode in the header data and encode this in the reversible encoding circuit 135. The upper layer encoding circuit 14 is configured to generate prediction mode data indicating the inter-layer/intra-field prediction when the lower predictive image data L_PREb(FI) is selected. The upper layer encoding circuit 14 is configured to generate prediction mode data indicating the inter-layer/intra-frame prediction when the lower predictive image data L_PREb (FR) is selected.

In the example explained above, the case where the recomposed image data generated in the lower layer encoding circuit 12 was used as the predictive image data of the intra-predictive encoding in the upper layer encoding circuit 14 was exemplified, but the recomposed image data and motion vector generated in the lower layer encoding circuit 12 may be utilized as the predictive image data of the inter-prediction encoding and the motion vector in the upper layer encoding circuit 14. This mode may also be used as a selection candidate.

[Multiplex Circuit]

The multiplex circuit 15 is configured to multiplex the lower encoded data S12 input from the lower layer encoding circuit 12 and the upper encoded data S14 input from the upper layer encoding circuit 14 to generate the encoded data S2.

[Example of Operation of Encoding Device]

An example of the operation of the encoding apparatus 2 shown in FIG. 2 will be explained next.

The layering circuit 10, as shown in FIG. 2, generates the progressive image data (progressive signal) S10_1 and the interlace image data S10_2 based on the image data S9 to be encoded. The layering circuit 10 outputs the picture data FR1 to FR6 . . . composing the above generated progressive image data S10_1 to the delay circuit 11. Further, the layering circuit 10 outputs the above generated interlace image data S10_2 to the lower layer encoding circuit 12.

The lower layer encoding circuit 12 encodes the interlace image data S10_2 input from the layering circuit 10 to generate the lower encoded data S12 and outputs this to the multiplex circuit 15. Further, the lower layer encoding circuit 12 generates the lower predictive image data L_PRE in the above encoding and outputs this to the transform circuit 13.

The transform circuit 13 interpolates the lower predictive image data L_PRE input from the lower layer encoding circuit 12, generates the lower predictive image data L_PREb having the same resolution (number of scanning lines) as that of the progressive image data S10_1 input from the delay circuit 12 by the upper layer encoding circuit 14, and outputs this to the upper layer encoding circuit 14.

The delay circuit 11 delays the picture data composing the progressive image data (progressive signal) S10_1 input from the layering circuit 10 by for example exactly the processing time in the lower layer encoding circuit 12 and the transform circuit 13 and outputs the result to the upper layer encoding circuit 14.

The upper layer encoding circuit 14 encodes the progressive image data S10_1 using the lower predictive image data L_PREb generated in the lower layer encoding circuit 12 input from the transform circuit 13 to generate the upper encoded data S14.

The multiplex circuit 15 multiplexes the lower encoded data S12 input from the lower layer encoding circuit 12 and the upper encoded data S14 input from the upper layer encoding circuit 14 to generate the encoded data S2.

<Decoding Device>

Figure 15:
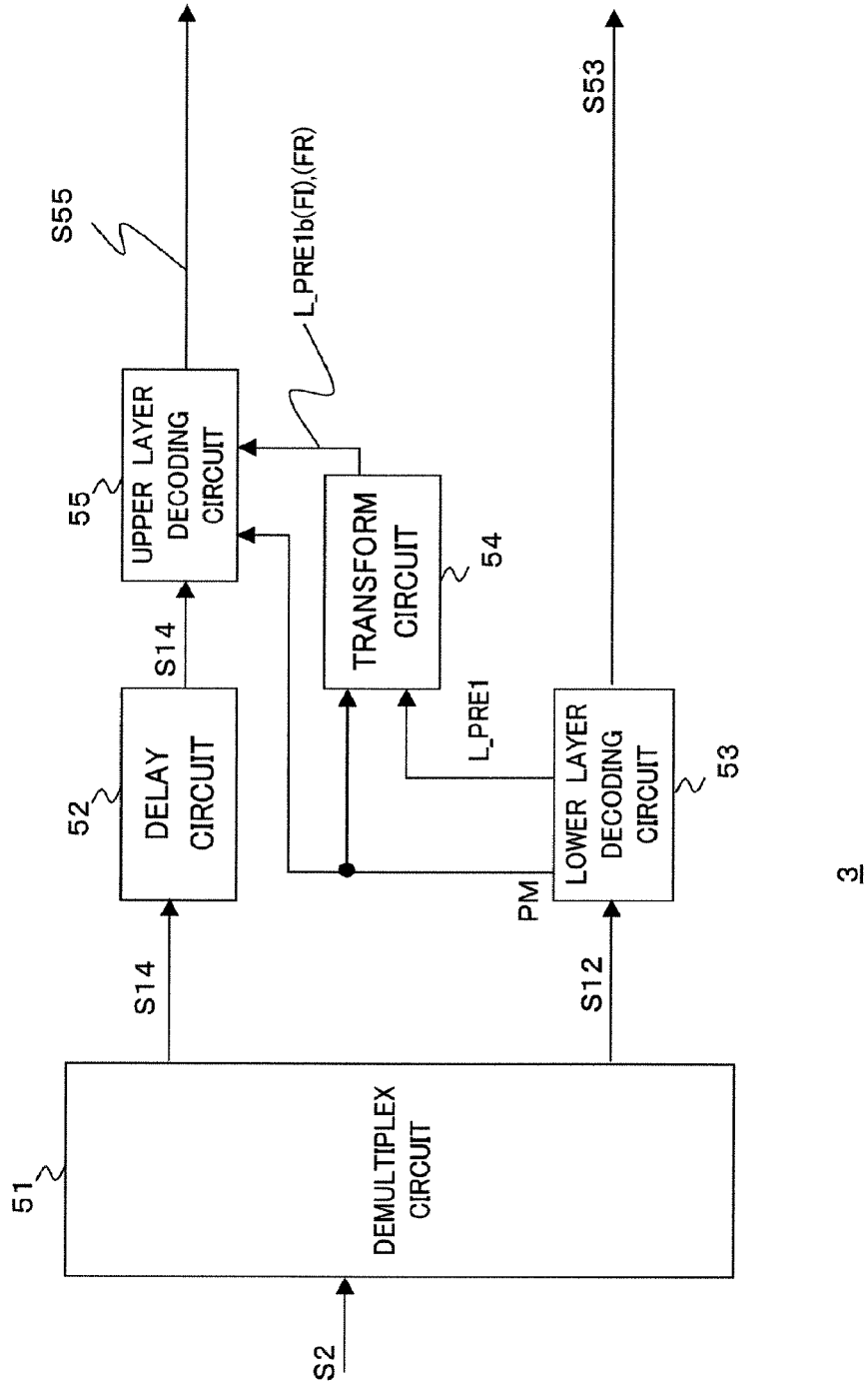
FIG. 15 is a diagram showing an example of the configuration of a decoding apparatus in the encoding and/or decoding system shown in FIG. 1.

FIG. 15 is a diagram showing an example of the configuration of the decoding apparatus 3 shown in FIG. 1.

The decoding apparatus 3 has for example a demultiplex circuit 51, delay circuit 52, lower layer decoding circuit 53, transform circuit 54, and upper layer decoding circuit 55.

[Demultiplex Circuit]

The demultiplex circuit 51 is configured to receive as input the encoded data S2 explained above generated by the encoding apparatus 2, demultiplex this to the lower encoded data S12 and the upper encoded data S14, output the lower encoded data S12 to the lower layer decoding circuit 53, and write the upper encoded data S14 into the delay circuit 52.

[Delay Circuit]

The delay circuit 52 is configured to delay the upper encoded data S14 input from the demultiplex circuit 51 by exactly the processing time in the lower layer decoding circuit 53 and the transform circuit 54 and output the result to the upper layer decoding circuit 55.

[Lower Layer Decoding Circuit]

Figure 16:
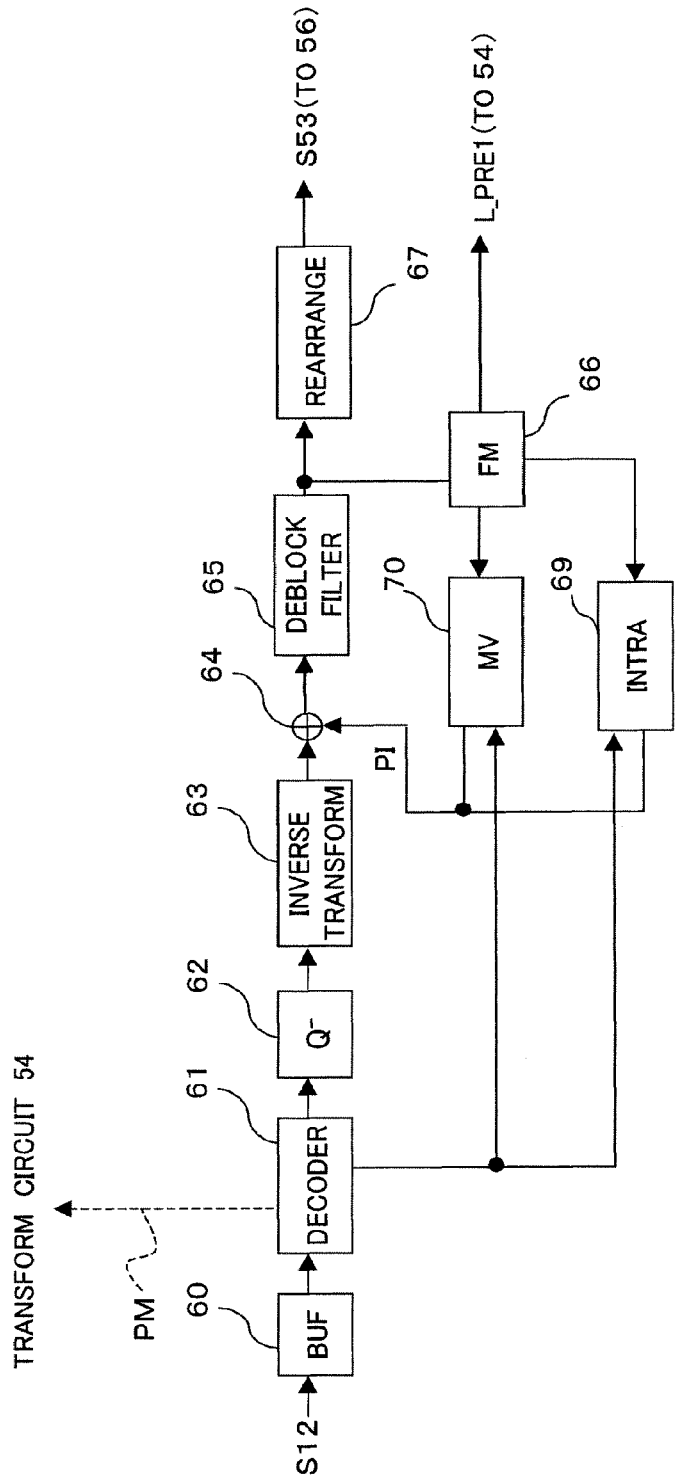
FIG. 16 is a diagram showing an example of the configuration of a lower layer decoding circuit shown in FIG. 15.

FIG. 16 is a diagram showing an example of the configuration of the lower layer decoding circuit 53.

The lower layer decoding circuit 53 has for example a storage buffer 60, reversible decoding circuit 61, inverse quantization circuit 62, inverse orthogonal transform circuit 63, adder circuit 64, deblock filter 65, frame memory 66, screen rearrangement buffer 67, intra-prediction circuit 69, and motion prediction and/or compensation circuit 70.

The lower encoded data S12 input from the demultiplex circuit 51 is written into the storage buffer 60.

The reversible decoding circuit 61 is, when judging that the macro block MB to be processed in the lower encoded data S12 is inter-coded, configured to decode the motion vector written in the header portion thereof and output the same to the motion prediction and/or compensation circuit 70. The reversible decoding circuit 61 is, when judging that the macro block MB to be processed in the lower encoded data S12 is intra-coded, configured to decode the intra-prediction mode information written in the header portion thereof and output the same to the intra-prediction circuit 69. The reversible decoding circuit 61 is configured to decode the lower encoded data S12 and output the result to the inverse quantization circuit 62. The reversible decoding circuit 61 is configured to decode the prediction mode data PM included in the header portion and output the decoded result to for example the transform circuit 54 shown in FIG. 15.

The inverse quantization circuit 62 is configured to inversely quantize the image data (orthogonal transform coefficient) decoded in the reversible decoding circuit 61 based on the quantization parameter input from the reversible decoding circuit 61 and output the result to the inverse orthogonal transform circuit 63.

The inverse orthogonal transform circuit 63 is configured to apply the inverse orthogonal transform processing of 4×4 to the image data orthogonal transform coefficient) input from the inverse quantization circuit 62 to generate the differential image data and output the result to the adder circuit 64.

The adder circuit 64 is configured to add the predictive image data PI from the motion prediction and/or compensation circuit 70 or the intra-prediction circuit 69 and the differential image data from the inverse orthogonal transform circuit 63 to generate the image data and output this to the deblock filter 65.

The deblock filter 65 is configured to apply deblock filtering to the image data input from the adder circuit 64 and write the decoded image data after processing into the frame memory 66 and the screen rearrangement buffer 67.

The decoded image data stored in the frame memory 66 is read out as the lower predictive image data L_PRE1 to the transform circuit 54 shown in FIG. 15.

The intra-prediction circuit 69 is configured to generate the predictive image data PI based on the intra-prediction mode input from the reversible decoding circuit 61 and the decoded image data read out from the frame memory 66 and output this to the adder circuit 64.

The motion prediction and/or compensation circuit 70 is configured to generate the predictive image data PI based on the decoded image data read out from the frame memory 66 and the motion vector input from the reversible decoding circuit 61 and output this to the adder circuit 64.

The screen rearrangement buffer 67 is configured to store the decoded image data written from the deblock filter 65. The decoded image data stored in the screen rearrangement buffer 67 is output as the lower decoded image data S53 in the sequence of display.

[Transform Circuit]

Referring to FIG. 15, the transform circuit 54 will be explained.

The transform circuit 54 is configured to interpolate lower predictive image data L_PRE1 input from the lower layer decoding circuit 53 based on the prediction mode data PM from the lower layer decoding circuit 53 to generate lower predictive image data L_PRE1$b$ having the same resolution (number of scanning lines) as that of the upper encoded data S14 read out from the delay circuit 52 by the upper layer decoding circuit 55 and output this to the upper layer decoding circuit 55.

Figure 17:
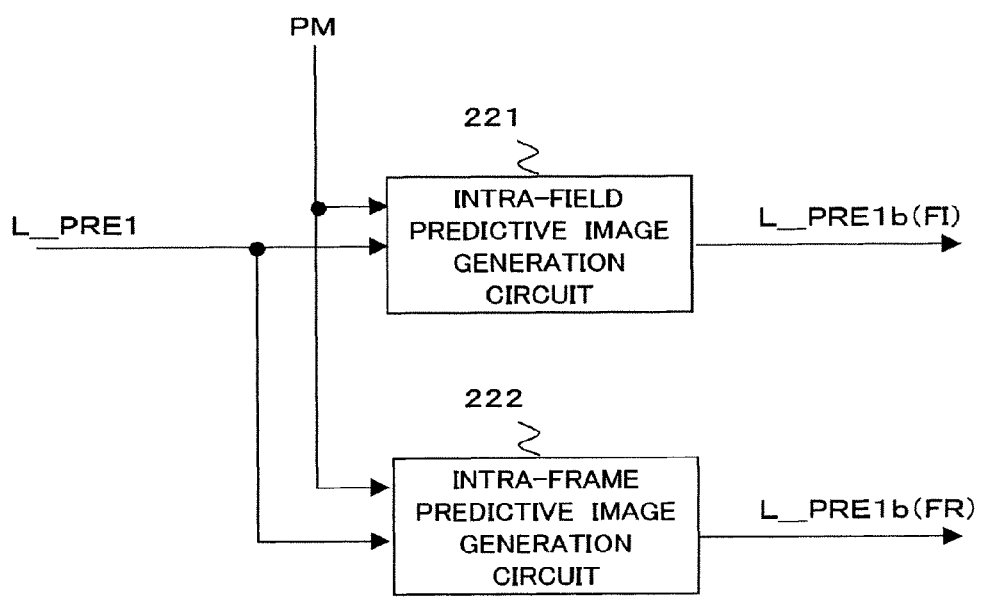
FIG. 17 is a diagram showing an example of the configuration of a transform circuit shown in FIG. 15.

FIG. 17 is a diagram showing an example of the configuration of the transform circuit 54.

The transform circuit 54 has for example an intra-field predictive image generation circuit 221 and intra-frame predictive image generation circuit 222.

The intra-field predictive image generation circuit 221 is configured to apply the interpolation explained with reference to FIG. 6 to FIG. 8 with respect to the lower predictive image data L_PRE1 to generate as the progressive image data the lower predictive image data L_PRE1$b$(FI) having the same resolution as that of the upper encoded data S14 when the prediction mode data PM indicates the inter-layer/intra-field prediction.

The intra-frame predictive image generation circuit 222 is configured to apply the interpolation explained with reference to FIG. 9 to FIG. 12 with respect to the lower predictive image data L_PRE1 to generate as the progressive image data the lower predictive image data L_PRE1$b$(FR) having the same resolution as that of the upper encoded data S14 when the prediction mode data PM indicates the inter-layer/intra-frame prediction.

The transform circuit 54 is configured to output the above generated lower predictive image data L_PRE1$b$(FI) and L_PRE1$b$(FR) to the upper layer decoding circuit 55.

[Upper Layer Decoding Circuit]

Figure 18:
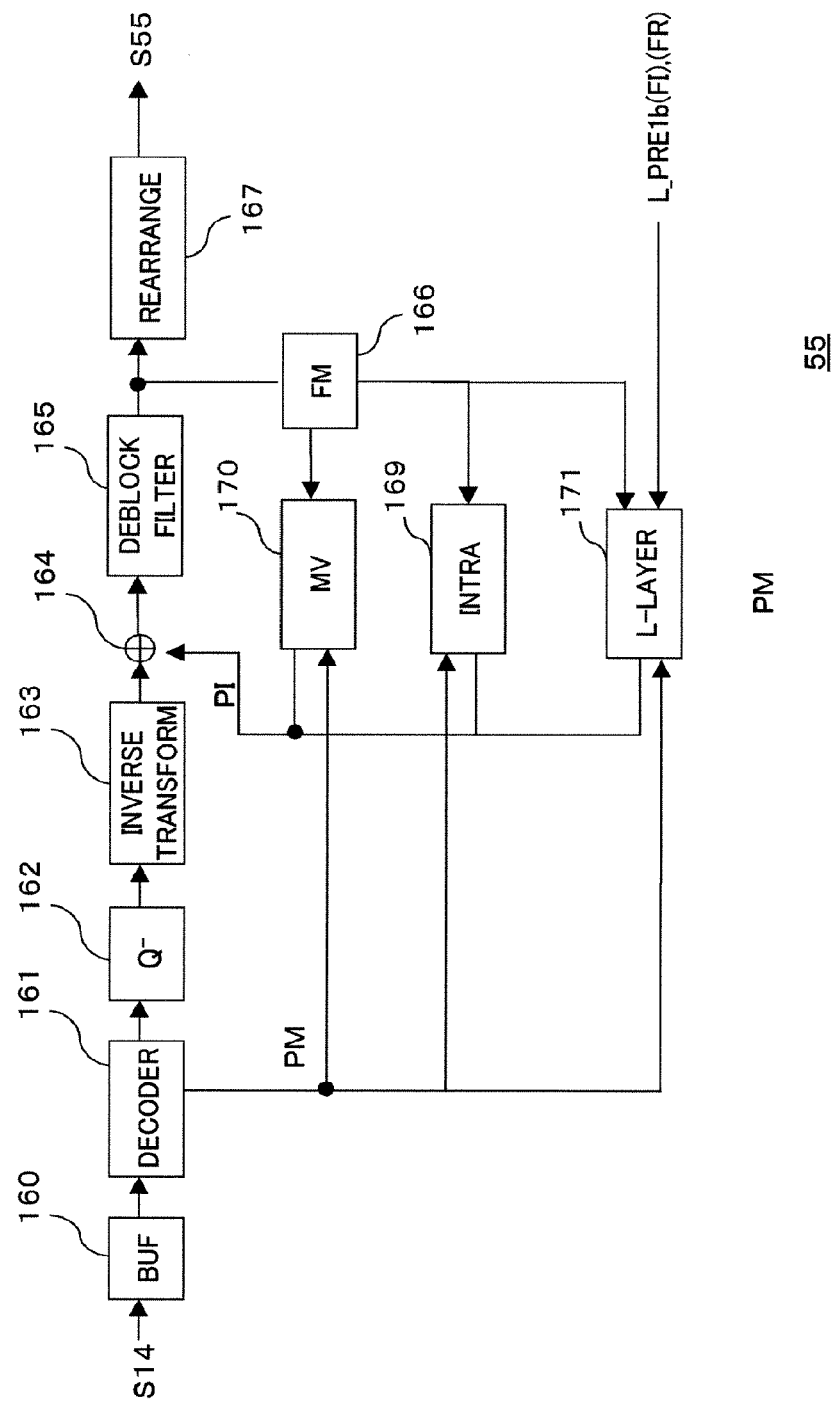
FIG. 18 is a diagram showing an example of the configuration of an upper layer decoding circuit shown in FIG. 15.

FIG. 18 is a diagram showing an example of the configuration of the upper layer decoding circuit 55.

The upper layer decoding circuit 55 has for example a storage buffer 160, reversible decoding circuit 161, inverse quantization circuit 162, inverse orthogonal transform circuit 163, adder circuit 164, deblock filter 165, frame memory 166, screen rearrangement buffer 167, intra-prediction circuit 169, motion prediction and/or compensation circuit 170, and lower layer prediction circuit 171.

The storage buffer 160 has the upper encoded data S14 read out from the delay circuit 52 written into it.

The reversible decoding circuit 161 is configured to decode the prediction mode data PM included in the header data.

The reversible decoding circuit 161 is configured to decode the motion vector written in the header portion of the macro block MB and output the same to the motion prediction and/or compensation circuit 170 when the prediction mode data PM indicates that the macro block MB to be processed in the upper encoded data S14 is inter-coded.

The reversible decoding circuit 161 is configured to decode the intra-prediction mode information written in the header portion of the macro block MB and output the same to the intra-prediction circuit 169 when the macro block MB to be processed in the upper encoded data S14 is intra-coded.

The reversible decoding circuit 161 is configured to notify the fact that the prediction mode data PM indicates the inter-layer/intra-field prediction or inter-layer/intra-frame prediction fact to the lower layer prediction circuit 171 when it indicates the same.

The reversible decoding circuit 161 is configured to decode the upper encoded data S14 and output the result to the inverse quantization circuit 162.

The reversible decoding circuit 161 is configured to output the prediction mode data PM to the motion prediction and/or compensation circuit 170, intra-prediction circuit 169, and lower layer prediction circuit 171.

The inverse quantization circuit 162 is configured to inversely quantize the image data (orthogonal transform coefficient) decoded in the reversible decoding circuit 161 based on the quantization parameter input from the reversible decoding circuit 61 and output the result to the inverse orthogonal transform circuit 163.

The inverse orthogonal transform circuit 163 is configured to apply the inverse orthogonal transform processing of 4×4 to the image data (orthogonal transform coefficient) input from the inverse quantization circuit 162 to generate the differential image data and output that to the adder circuit 164.

The adder circuit 164 is configured to add the predictive image data PI from the motion prediction and/or compensation circuit 170, intra-prediction circuit 169, or lower layer prediction circuit 171 etc. and the differential image data from the inverse orthogonal transform circuit 163 to generate the image data and output this to the deblock filter 165.

The deblock filter 165 is configured to apply the deblock filtering to the image data input from the adder circuit 164 and write the decoded image data after processing into the frame memory 166 and the screen rearrangement buffer 167.

The intra-prediction circuit 169 is configured to generate the predictive image data PI based on the intra-prediction mode indicated by the prediction mode data PM input from the reversible decoding circuit 161 and the decoded image data read out from the frame memory 166 and output this to the adder circuit 164 when normal intra-prediction is designated.

The motion prediction and/or compensation circuit 170 is configured to generate the predictive image data PI based on the decoded image data read out from the frame memory 166 and the motion vector input from the reversible decoding circuit 161 and output this to the adder circuit 164 when the prediction mode data PM indicates the inter-prediction.

The lower layer prediction circuit 171 is configured to output the lower predictive image data L_PRE1$b$(FI) and L_PRE1$b$(FR) input from the transform circuit 54 or the data obtained by applying predetermined processing with respect to that as the predictive image data to the adder circuit 164 when the prediction mode data PM indicates inter-layer/intra-field prediction or inter-layer/intra-frame prediction.

The screen rearrangement buffer 167 is configured to store the decoded image data written from the deblock filter 165. It is configured so that the decoded image data stored in the screen rearrangement buffer 167 is output as the upper decoded image data S55 in the display sequence.

[Example of Operation of Decoding Device]

The demultiplex circuit 51 is configured to receive as input the encoded data S2 explained above generated by the encoding apparatus 2, demultiplex this to the lower encoded data S12 and the upper encoded data S14, output the lower encoded data S12 to the lower layer decoding circuit 53, and write the upper encoded data S14 into the delay circuit 52.

The delay circuit 52 is configured to delay the upper encoded data S14 input from the demultiplex circuit 51 by exactly the processing time in the lower layer decoding circuit 53 and the transform circuit 54 and output the same to the upper layer decoding circuit 55.

The lower layer decoding circuit 53 is configured to decode the lower encoded data S12 to generate the lower decoded image data S53 and output this. Further, the lower layer decoding circuit 53 is configured to generate the lower predictive image data L_PRE1(FI) and L_PRE1(FR) and output these to the transform circuit 54.

In the transform circuit 54, the lower predictive image data L_PRE1 is transformed to the lower predictive image data L_PRE1$b$(FI) and L_PRE1$b$(FR) having (FI) and (FR) progressive resolutions and output to the upper layer decoding circuit 55.

The upper layer decoding circuit 55 is configured to decode the upper encoded data S14 based on the lower predictive image data L_PRE1$b$(FI) and L_PRE1$b$(FR) to generate the upper decoded image data S55 and output this.

As explained above, according to the encoding and/or decoding system 1 of the present embodiment, the encoding apparatus 2 can encode the progressive image data S10_1 in the upper layer and can encode the interlace image data S10_2 in the lower layer when performing layered encoding.

Further, according to the encoding and/or decoding system 1, the decoding apparatus 3 can decode the progressive image data S10_1 and the interlace image data S10_2 which are layered encoded at the encoding apparatus 2.

The present invention is not limited to the above embodiment.

Namely, those skilled in the art may make various modifications, combinations, sub-combinations, and alterations to the elements of the above embodiment insofar as they are within the technical scope of the present invention or within the scope of its equivalents.

Figure 19:
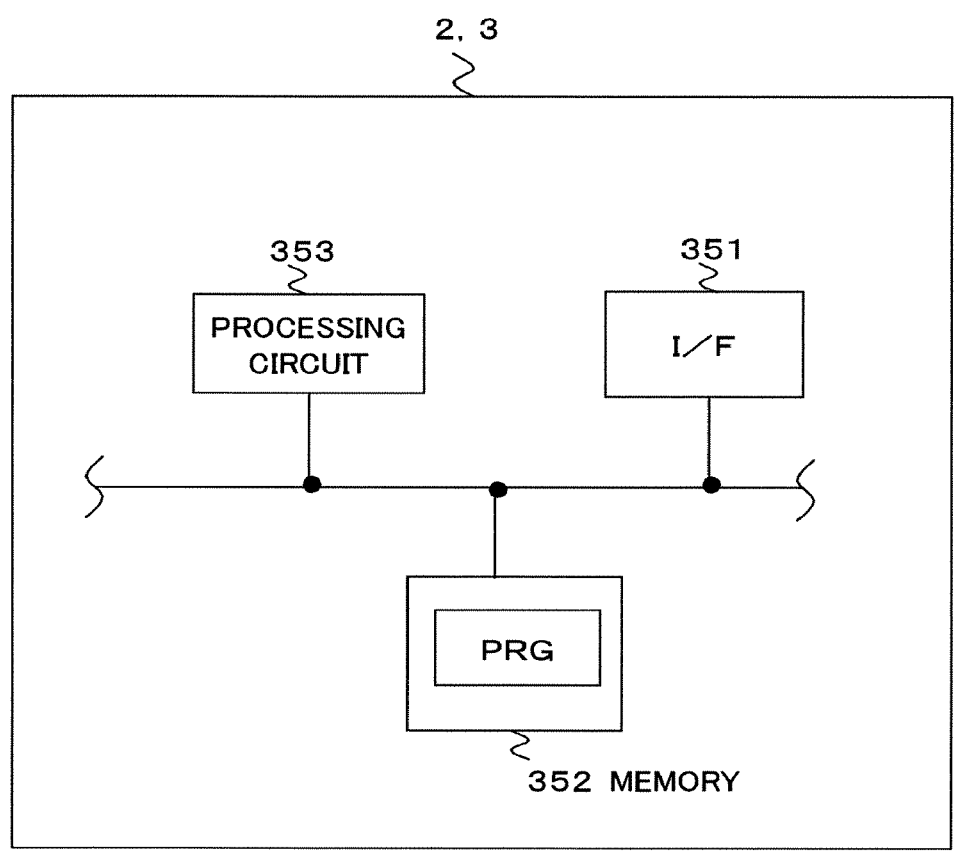
FIG. 19 is a diagram for explaining a modification of the embodiment of the present invention.

For example, all or part of the functions of the encoding apparatus 2 or decoding apparatus 3 explained above may be executed by a processing circuit 353 such as a CPU (Central Processing Unit) according to the script of a program PRG stored in a memory 352 as shown in FIG. 19.

In this case, the image data to be encoded or decoded is input, and processing results thereof are output via an interface 351.

An example of the codes newly defined in the macro block layer in the embodiment explained above is shown in the following Table 1 and Table 2.

TABLE 1

| macroblock_layer_in_scalable_extension( ){ | C | Descriptor |
|---|---|---|
| if(base_id_plus1 != 0 && adaptive_prediction_flag){ | | |
| base_mode_flag | 2 | ae(v) |
| If( ! base_mode_flag && HalfSpatResBaseFlag && ! intra_base_mb(CurrMbAddr)) | | |
| base_mode_refinement_flag | 2 | ae(v) |
| } | | |
| if( ! base_mode_flag && ! base_mode_refinement_flag){ | | |
| mb_type | 2 | ae(v) |
| If(mb_type == I_NxN && base_id_plus1 != 0) | | |
| intra_base_flag | 2 | ae(v) |
| } | | |
| if(intra_base_flag && interlace_base_layer && progressive_curr_layer){ | | |
| lower layer_intra_prediction_mode | 2 | ae(v) |
| } | | |

TABLE 2

| macroblock_layer_in_scalable_extension( ){ | C | Descriptor |
|---|---|---|
| if(base_id_plus1 != 0 && adaptive_prediction_flag){ | | |
| base_mode_flag | 2 | ae(v) |
| If( ! base_mode_flag && HalfSpatResBaseFlag && ! intra_base_mb(CurrMbAddr)) | | |
| base_mode_refinement_flag | 2 | ae(v) |
| } | | |
| if( ! base_mode_flag && ! base_mode_refinement_flag){ | | |
| mb_type | 2 | ae(v) |
| If(mb_type == I_NxN && base_id_plus1 != 0) | | |
| intra_base_flag | 2 | ae(v) |
| } | | |
| if(intra_base_flag && interlace_base_layer && progressive_curr_layer && frame_structure_base_block){ | | |
| lower_layer_intra_prediction_mode | 2 | ae(v) |
| } | | |

"lower#layer#intra#prediction#mode" shown in above Table 1 and Table 2 is the flag data stored in the encoded data together with the prediction mode.

The flag data indicates "0" when the up sample technique shown in FIG. 6 to FIG. 8 is used and indicates "1" when the up sample technique shown in FIG. 9 to FIG. 12 is used.

When the flag data does not exist, it is judged that "0" is indicated.

"ae(v)" indicates that the designated syntax is a context-adaptive entropy code.

"base#id#plus1" is the parameter for specifying the base picture data used for predicting the motion vector of the current picture, the pixel data, and the differential data.

"adaptive#prediction#flag" indicates presence/absence of the syntax element in the macro block layer in the scalable extension and indicates "0" when there is nothing.

When "base#mode#flag" indicates "1", mb#type of the current macro block is indicated, while when the reference numeral is indicated, the motion vector is indicated in accordance with the corresponding base macro block.

When "base#mode#flag" indicates "0", "mb#type" is not estimated when "base#mode#refinement#flag" is not "1".

When "base#mode"flag" does not exist, "base#mode"flag" is estimated as follows.

When "base#id#plus1" indicates "0", it is estimated that the value of "base#mode"flag" is "0". Where "base#id#plus1" does not indicate "0", it is estimated that the value of "base#mode"flag" is "1".

When "base#id#plus1" is larger than "0", and the base layer has a width of ½ and a height of ½ of those of the current layer, HalfSpatResBaseFlag is set at "1", while it is set at "0" in cases other than that.

"intra#base#mb(CurrMbAddr)" is the function for returning "1" when the base macro block of CrarmbAddr is the I macro block and returning "1" in cases other than that.

The case where "base#mode#refinement#flag" indicates "1" indicates that the mb#type of the current macro block and the reference numeral are estimated based on the corresponding base macro block. When "base#mode#refinement#flag" indicates "1", a motion vector obtained by adding ¼ pixel resolution to the prediction value of the motion vector obtained by using the motion vector of the base macro block is specified.

When "base#mode#refinement#flag" indicates "0", mb#type is not estimated.

"mb#type" indicates the macro block type. The semantic of "mb#type" depends upon the slice type.

A case where "intra#base#flag" indicates "1" indicates the macro block type I#BL.

When "intra#base#flag" does not exist, "intra#base#flag" is estimated as shown below.

When "base#mode#flag" is "1" and "mb#type" is INxN, it is estimated that "intra#base#flag" is "1". It is estimated that "intra#base#flag" is "0" in cases other than that.

"I#N×N" indicates that the macro block type is any of intra 6×6, intra 4×4, or I_BL.

"I#BL" indicates that the prediction value thereof is not the peripheral pixel data, but the intra-macro block obtained from the base picture data.

"interlace#base#layer" indicates that the source of the base layer is the interlace format.

"progressive#curr#layer" indicates that the source of the current layer is the progressive format.

"frame#structure#base#block" indicates that the base block is encoded by the frame structure.

For reference, an embodiment of an encoding and/or decoding system including the encoding apparatus and the decoding apparatus of the present invention will be explained.

The correspondence between the configuration of the encoding and/or decoding system of the present embodiment and the configuration of the present invention will be explained.

The encoding apparatus 2 is an example of the encoding apparatus of the present invention. When the processing content (function) of the encoding apparatus 2 is described by the program PRG exemplified in FIG. 19, this program PRG is an example of the program of the present invention. Such a program is usually stored in a storage medium or traded via the communication channel and performs operations when loaded in a computer. Accordingly, the program of the present invention includes such a transaction format and operation format.

The lower layer encoding circuit 12 explained with reference to FIG. 2 is an example of the first encoding means and first encoding unit of the present invention, the transform circuit 13 is an example of the up sample processing means and up sample processing unit, and the upper layer encoding circuit 14 is an example of the second encoding means and second encoding unit.

The decoding apparatus 3 is an example of the decoding apparatus of the present invention. When the processing content (function) of the decoding apparatus 3 is described by the program PRG exemplified in FIG. 19, this program PRG is an example of the program of the present invention. Such a program is usually stored in a storage medium or traded via a communication channel and performs operations when loaded in the computer. Accordingly, the program of the present invention includes such a transaction format and operation format.

The lower layer decoding circuit 53 explained with reference to FIG. 15 is an example of the first decoding means and first decoding unit of the present invention, the transform circuit 54 is an example of the up sample processing means and up sample processing unit, and the upper layer decoding circuit 55 is an example of the second decoding means and second encoding unit.

The invention claimed is:

1. A hardware encoding apparatus for encoding progressive image data and interlace image data corresponding to the progressive image data, the hardware encoding apparatus comprising:
   a first encoding unit configured to:
     encode the interlace image data to generate first encoded data; and
     generate recomposed image data based on the interlace image data;
   an up sample processing unit configured to up sample the recomposed image data generated by the first encoding unit to generate predictive image data having a same resolution as that of the progressive image data, wherein the up sample processing unit includes:
     a first predictive image generation unit configured to generate the predictive image data of a first kind based on intra-field interpolation; and
     a second predictive image generation unit configured to generate the predictive image data of a second kind that is different from the predictive image data of the first kind;
     wherein the up sample processing unit is configured to select one of the first and second predictive image generation units to generate the predictive image data based on flag data; and
   a second encoding unit configured to encode the progressive image data based on the predictive image data generated by the up sample processing unit to generate second encoded data.

2. A hardware encoding apparatus for encoding progressive image data and interlace image data corresponding to the progressive image data, the hardware encoding apparatus comprising:
   a first encoding means configured to:
     encode the interlace image data to generate first encoded data; and
     generate recomposed image data based on the interlace image data;
   an up sample processing means configured to up sample the recomposed image data generated by the first encoding means to generate predictive image data having a same resolution as that of the progressive image data, wherein the up sample processing means includes:
     a first predictive image generation means configured to generate the predictive image data of a first kind based on intra-field interpolation; and
     a second predictive image generation means configured to generate the predictive image data of a second kind that is different from the predictive image data of the first kind;
     wherein the up sample processing means is configured to select one of the first and second predictive image generation means to generate the predictive image data based on flag data; and
   a second encoding means configured to encode the progressive image data based on the predictive image data generated by the up sample processing means to generate second encoded data.

3. An encoding method for encoding progressive image data and interlace image data corresponding to the progressive image data, comprising:
   encoding the interlace image data and generating first encoded data;
   generating recomposed image data based on the interlace image data;
   up sampling the recomposed image data to generate predictive image data having a same resolution as that of the progressive image data, including:
     selecting one of a first and a second predictive image generation methods to generate the predictive image data based on flag data, wherein:
       the first predictive image generation method includes generating the predictive image data of a first kind based on intra-field interpolation; and
       the second predictive image generation method includes generating the predictive image data of a second kind that is different from the predictive image data of the first kind; and
   encoding the progressive image data based on the predictive image data to generate second encoded data.

4. A non-transitory computer-readable medium storing a program executed by a computer for encoding progressive image data and interlace image data corresponding to the progressive image data, which program makes the computer execute the following steps:
   encoding the interlace image data and generating first encoded data;
   generating recomposed image data based on the interlace image data;
   up sampling the recomposed image data to generate predictive image data having a same resolution as that of the progressive image data, including:
     selecting one of a first and a second predictive image generation methods to generate the predictive image data based on flag data, wherein:
       the first predictive image generation method includes generating the predictive image data of a first kind based on intra-field interpolation; and
       the second predictive image generation method includes generating the predictive image data of a second kind that is different from the predictive image data of the first kind; and
   encoding the progressive image data based on the predictive image data to generate second encoded data.

* * * * *